United States Patent
Ivanov et al.

(10) Patent No.: US 11,522,916 B2
(45) Date of Patent: *Dec. 6, 2022

(54) SYSTEM AND METHOD FOR CLUSTERING NETWORKED ELECTRONIC DEVICES TO COUNTER CYBERATTACKS

(71) Applicant: AO Kaspersky Lab, Moscow (RU)

(72) Inventors: Dmitry G. Ivanov, Moscow (RU); Andrey V. Ladikov, Moscow (RU); Pavel V. Filonov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 215 days.

This patent is subject to a terminal disclaimer.

(21) Appl. No.: 16/890,098

(22) Filed: Jun. 2, 2020

(65) Prior Publication Data
US 2021/0099489 A1    Apr. 1, 2021

Related U.S. Application Data

(63) Continuation of application No. 16/889,547, filed on Jun. 1, 2020, now Pat. No. 11,388,196.

(30) Foreign Application Priority Data

Sep. 30, 2019   (RU) .......................... RU2019130605

(51) Int. Cl.
*H04L 9/40* (2022.01)
*G06N 5/04* (2006.01)
(Continued)

(52) U.S. Cl.
CPC ............... *H04L 63/20* (2013.01); *G06N 5/04* (2013.01); *G06N 20/00* (2019.01);
(Continued)

(58) Field of Classification Search
CPC . H04L 63/20; H04L 63/1416; H04L 63/1441; G06N 20/00; G06N 3/02; G06N 5/003; G06F 16/906
See application file for complete search history.

(56) References Cited

U.S. PATENT DOCUMENTS

| | | | |
|---|---|---|---|
| 9,060,018 B1* | 6/2015 | Yu | H04L 67/30 |
| 2002/0049685 A1* | 4/2002 | Yaginuma | G06N 3/02 706/21 |

(Continued)

*Primary Examiner* — Ali S Abyaneh
(74) *Attorney, Agent, or Firm* — ArentFox Schiff LLP; Michael Fainberg

(57) ABSTRACT

A method for defending a network of electronic devices from cyberattacks includes obtaining information about a plurality of devices and information about communication links between the plurality of devices and surrounding environment and determining types of the communication links using heuristic rules. The types of communication links are compared using corresponding link profiles. One or more similar communication links are identified based on the comparison. A cluster of devices is generated by combining a subset of the plurality of devices. The cluster includes one or more devices having one or more similar communication links. A surrounding environment profile is generated for the generated cluster of devices. When a cyberattack is detected on one of the devices in the cluster, the surrounding environment profile is modified for the cluster of devices in order to defend all devices in the cluster from the cyberattack.

16 Claims, 16 Drawing Sheets

(51) Int. Cl.
*G06N 20/00* (2019.01)
*H04L 67/52* (2022.01)

(52) U.S. Cl.
CPC ...... *H04L 63/1416* (2013.01); *H04L 63/1441* (2013.01); *H04L 67/52* (2022.05)

(56) References Cited

U.S. PATENT DOCUMENTS

| | | | |
|---|---|---|---|
| 2008/0239976 A1* | 10/2008 | Altman | H04B 7/18593 370/465 |
| 2009/0052333 A1* | 2/2009 | Vankov | H04L 43/50 370/242 |
| 2013/0173621 A1 | 7/2013 | Kapoor | |
| 2015/0235275 A1 | 8/2015 | Shah et al. | |
| 2016/0099963 A1 | 4/2016 | Mahaffey et al. | |
| 2016/0125471 A1 | 5/2016 | Hsu et al. | |
| 2016/0234232 A1* | 8/2016 | Poder | H04L 63/1408 |
| 2017/0032279 A1* | 2/2017 | Miserendino | G06N 5/04 |
| 2017/0171231 A1 | 6/2017 | Reybok et al. | |
| 2021/0021616 A1* | 1/2021 | Shabtai | H04L 63/1416 |

\* cited by examiner

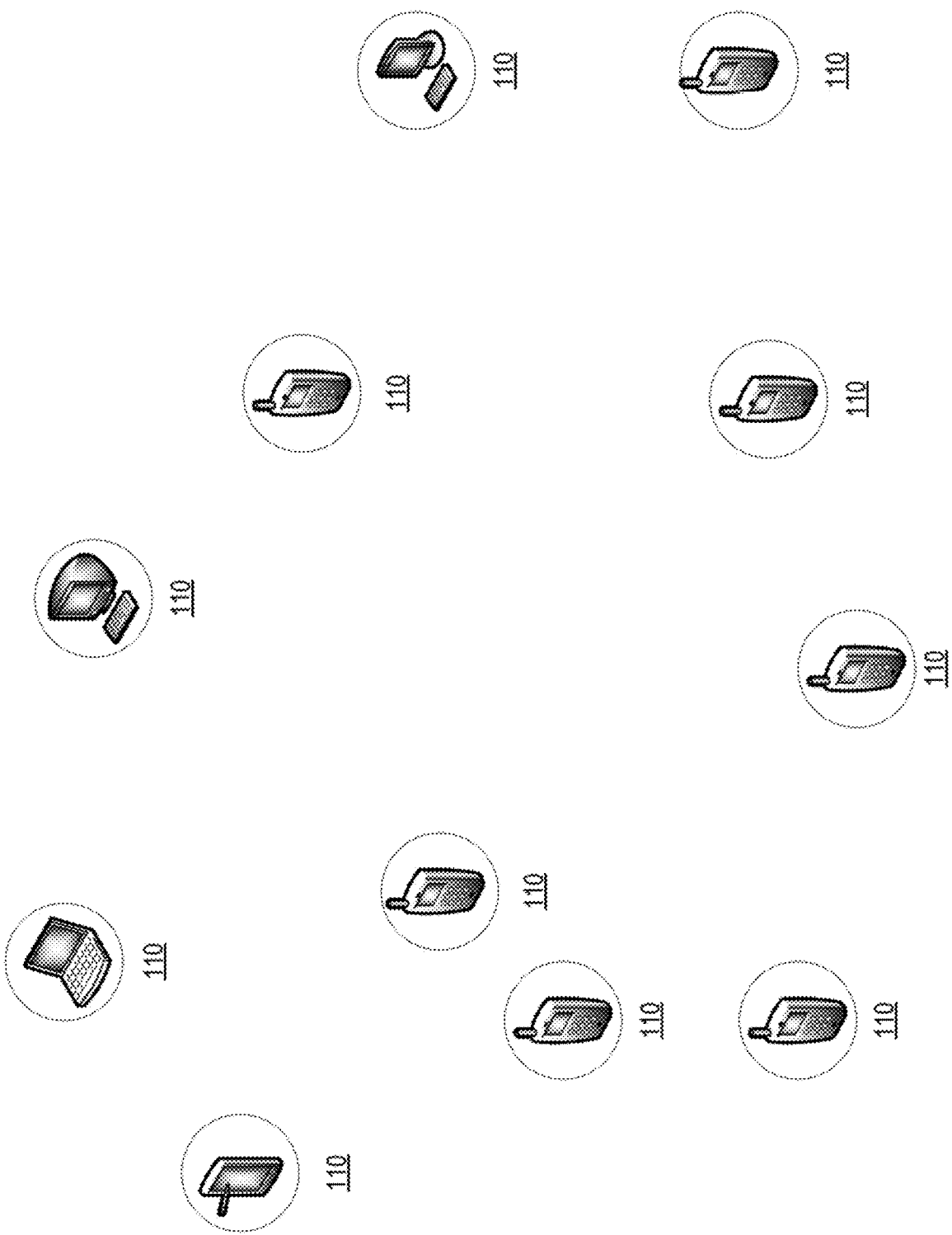

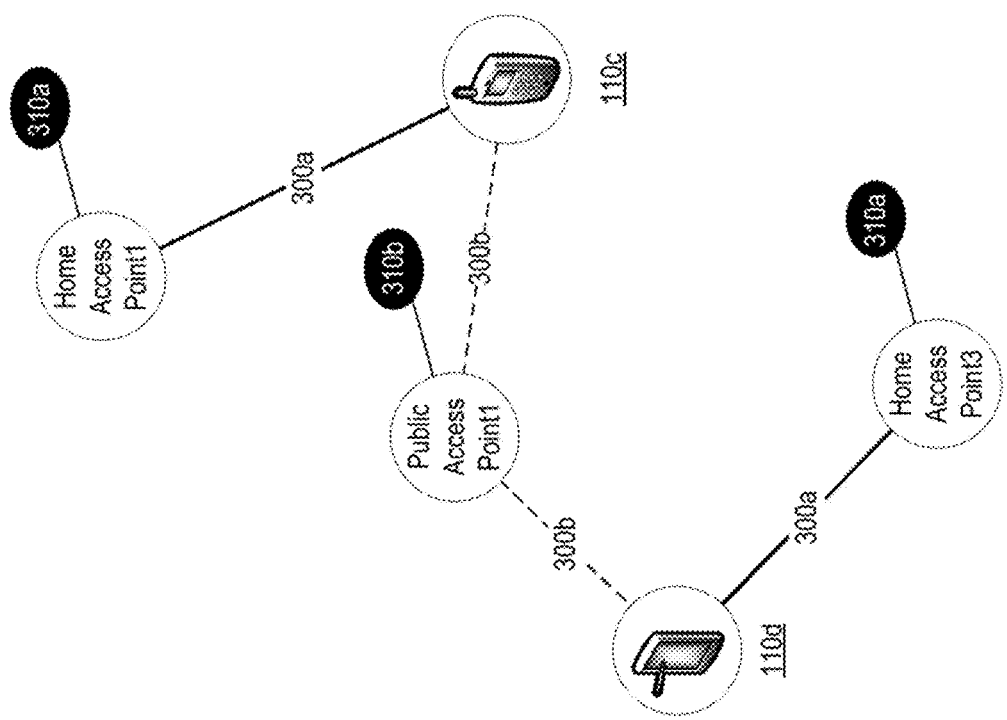
Fig. 4c
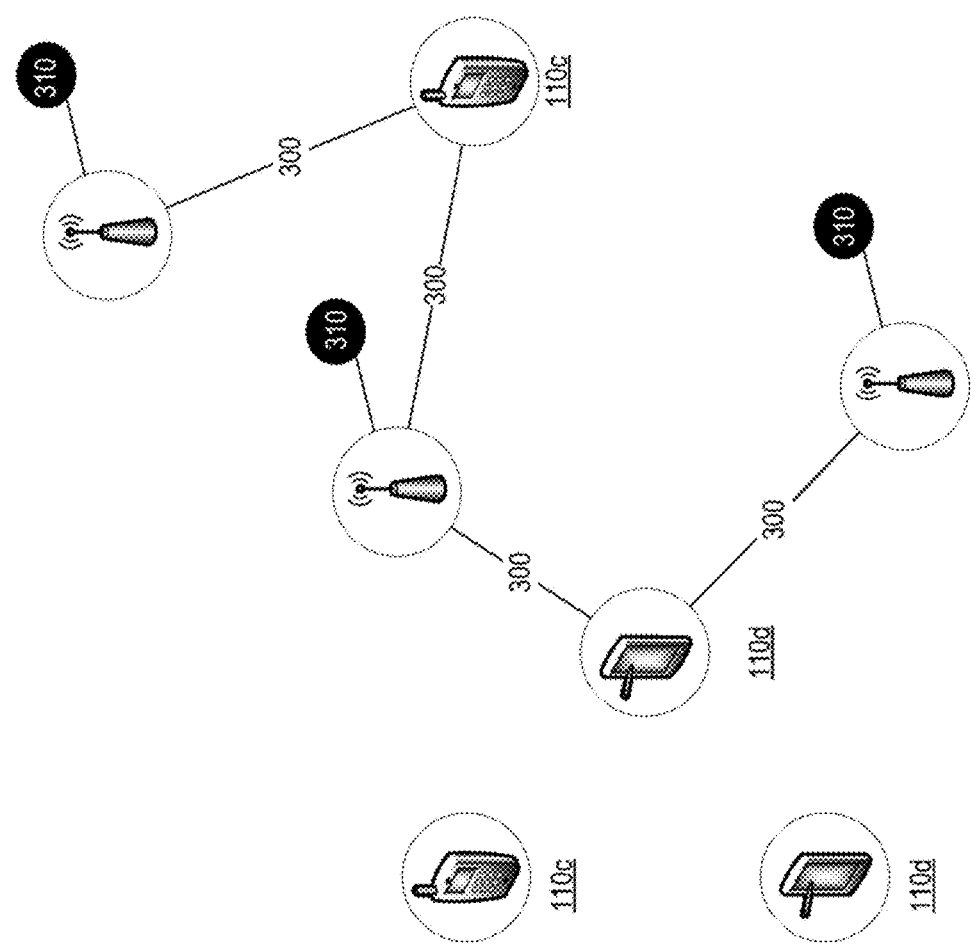
Fig. 4b
Fig. 4a

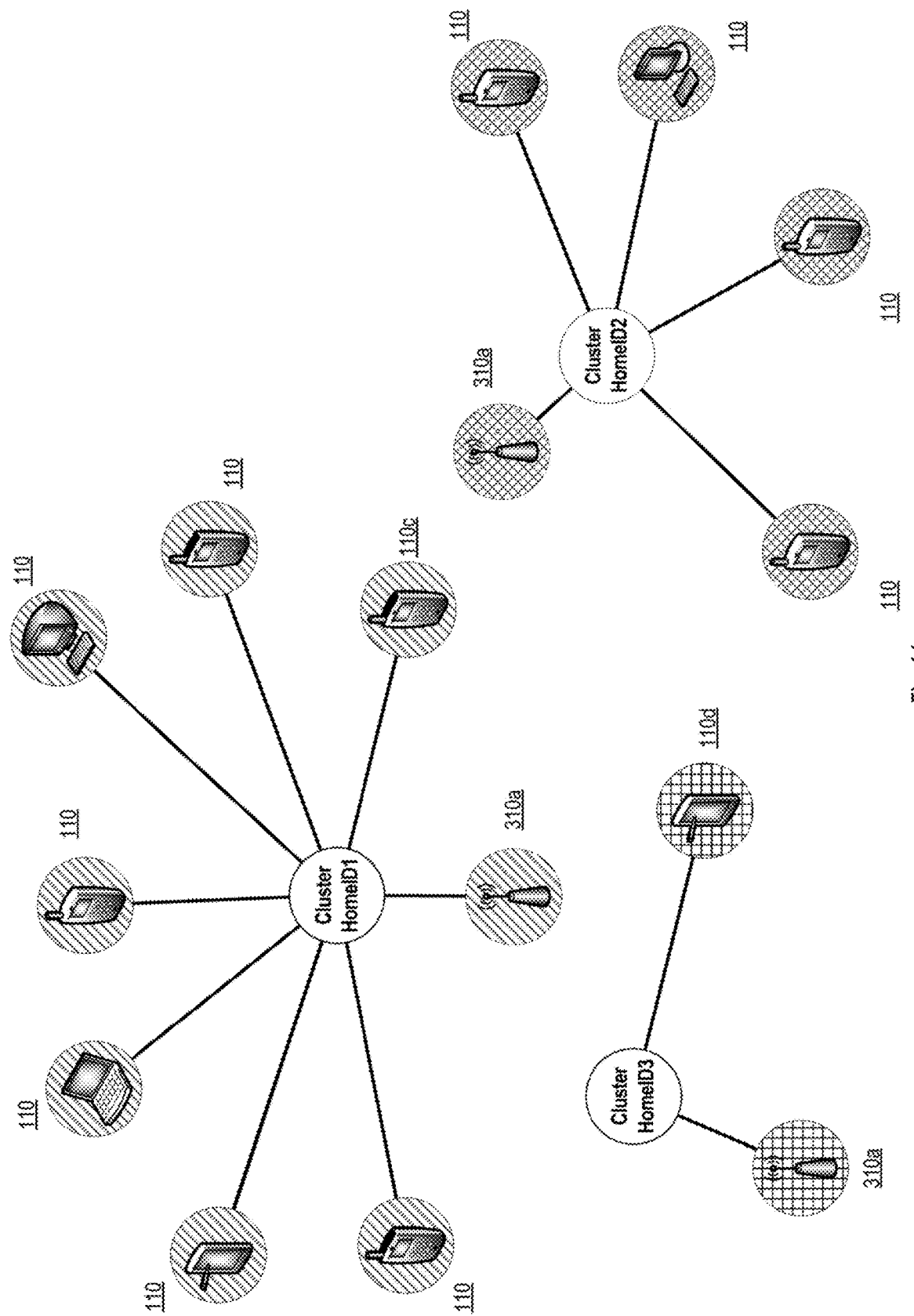

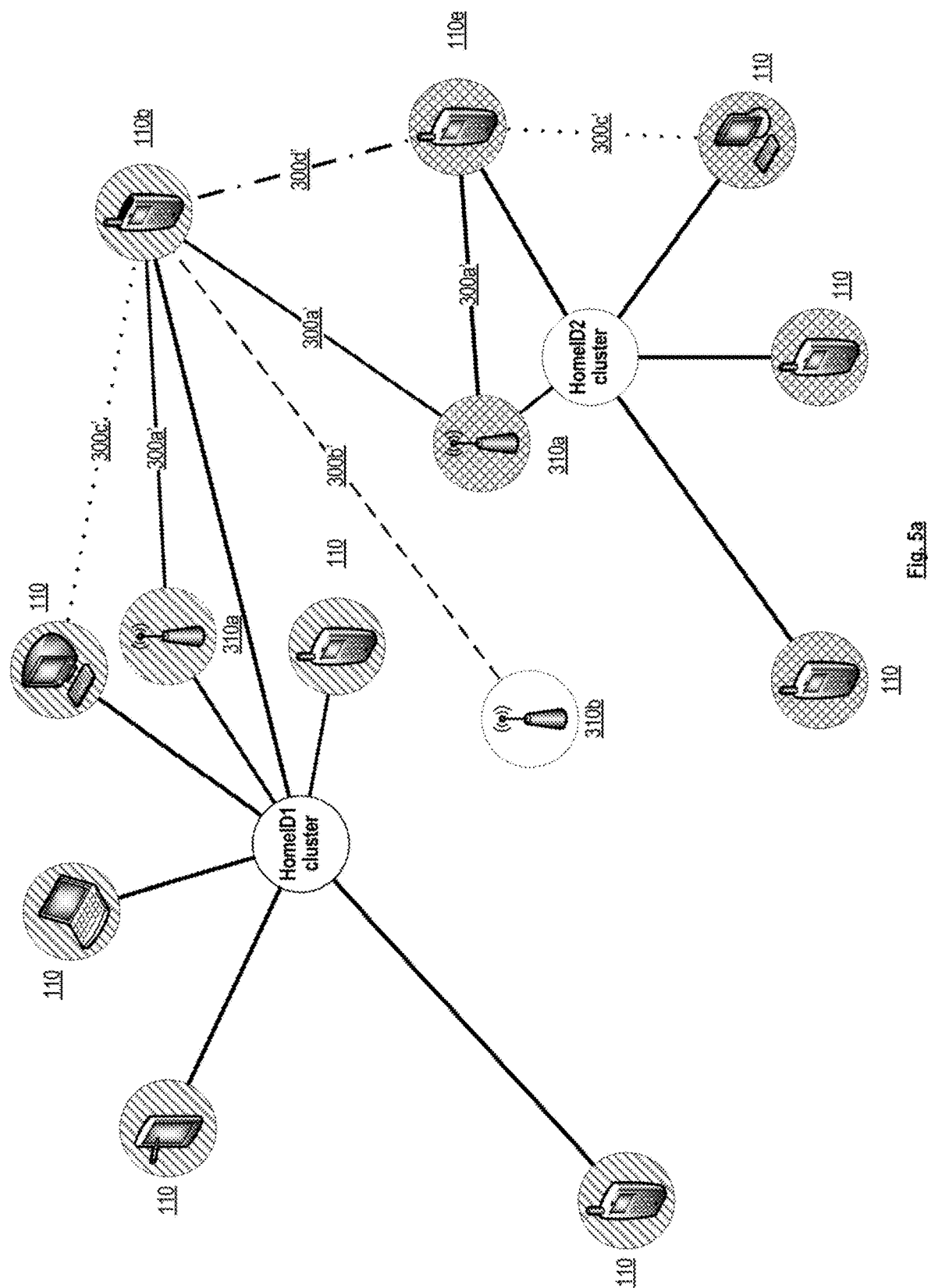

SYSTEM AND METHOD FOR CLUSTERING NETWORKED ELECTRONIC DEVICES TO COUNTER CYBERATTACKS

CROSS-REFERENCE TO RELATED APPLICATION

The present application is a Continuation of and claims priority to patent application Ser. No. 16/889,547 filed Jun. 1, 2020, which in turn claims priority to a Russian Application No. 2019130605 filed on Sep. 30, 2019, all which are incorporated by reference herein.

FIELD OF TECHNOLOGY

The present disclosure relates to the field of computer networking, and, more specifically, system and method for clustering networked electronic devices to counter cyberattacks.

BACKGROUND

The number of electronic devices belonging to the same household or user is constantly growing. A vast majority of these devices include a network interface. These devices now include not only personal computers and smartphones, but also television sets, gaming consoles, and even household appliances. Accordingly, the need has arisen to logically link these devices into a single network around their owner/user, which is the concept of a smart home system, and is a concept of a future smart environment. Interconnected devices are necessary at least for: centralized control of the devices (including control of the security of the devices); carrying out marketing campaigns; effective communication with the user; authentication on several devices (cross-device authentication) and so forth.

The leaders in the development of technologies for the linking of devices and the analysis of user activity are various companies engaging, for example, in advertising, electronic commerce, profiling for a customer data platform (CDP), or having multiplatform software and software/hardware solutions.

Companies facilitating the security of computer systems also need to detect new devices in a networked environment and correlate the detected devices with a particular user in order to provide protection for the device and/or the network. This need arises from the fact that a plurality of devices interact with each other and any given device from the plurality of devices may become the vector of an attack on another device and user data. Therefore all the devices in a networked environment should be protected, but for this protection to take place, all interconnected devices should be detected and associated with the user.

Conventional automatic methods of linking devices rely on data which can be removed (such as cookies, which can be deleted) or on heuristics having inadequate accuracy. Thus there is a need for a technology that would provide a reliable and long-lasting linkage of devices, relate them to a profile and operatively respond to a change in the user profile.

SUMMARY

Aspects of the disclosure relate to the field of computer networking.

Aspects of the disclosure are designed to generate environment profiles for devices having similar communication links. In the present disclosure, information about the device and the environment surrounding the device is collected to accomplish this.

The technical result of the disclosure is the defense of a network of electronic devices from cyberattacks. In one exemplary aspect, a method for defending a network of electronic devices from cyberattacks includes obtaining information about a plurality of devices and information about communication links between the plurality of devices and surrounding environment and determining types of the communication links using heuristic rules. The types of communication links are compared using corresponding link profiles. One or more similar communication links are identified based on the comparison. A cluster of devices is generated by combining a subset of the plurality of devices. The cluster includes one or more devices having one or more similar communication links. A surrounding environment profile is generated for the generated cluster of devices. When a cyberattack is detected on one of the devices in the cluster, the surrounding environment profile is modified for the cluster of devices in order to defend all devices in the cluster from the cyberattack.

In one aspect, the heuristic rules are generated based on one or more characteristics of the communication links having a known type. The heuristic rules may be used to identify a type of an unknown communication link.

In one aspect, the types of the communication links are determined using a machine learning model. The machine learning model may include one of: a decision-making tree model, a neural net model, a clustering model.

In one aspect, two communication links are identified as similar if the distance between an N-dimensional vector of characteristics of a first communication link and an N-dimensional vector of characteristics of a second communication link in N-dimensional space is less than a threshold value.

In one aspect, the link profile includes an N-dimensional vector of communication link characteristics.

In one aspect, the communication link characteristics include one or more of: one or more rules for forming the network connection between an electronic device and the environment surrounding the electronic device, duration of the network connection established between the electronic device and the environment surrounding the electronic device, type of the network connection between the electronic device and the environment surrounding the electronic device, stability of the network connection between the electronic device and the environment surrounding the electronic device, geolocation of the network connection between the electronic device and the environment surrounding the electronic device, one or more characteristics of the network traffic exchanged between the electronic device and the environment surrounding the electronic device.

In one aspect, comparing the types of communication links further includes comparing the N-dimensional vector of the communication link having an unknown type with the N-dimensional vector of the communication link having a known type.

In one aspect, two communication links are identified as similar if the distance between the N-dimensional vector of a first communication link and the N-dimensional vector of a second communication link in N-dimensional space is less than a threshold value.

In one aspect, generating the cluster of devices includes comparing the N-dimensional vectors of the communication links associated with the plurality of devices and assigning a device to a respective cluster if the N-dimensional vector associated with the device falls within a radius of the corresponding cluster.

In one aspect, modifying the surrounding environment profile includes modifying one or more characteristics of the one or more communication links to defend all devices in the cluster from the cyberattack.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 3a shows a set of electronic devices obtained for the generation of clusters, in accordance with aspects of the present disclosure.

FIG. 4a shows the devices for the clustering, in accordance with aspects of the present disclosure.

FIG. 4b shows the devices with detected links, in accordance with aspects of the present disclosure.

FIG. 4c shows the electronic devices with detected links after the types of the links are determined, in accordance with aspects of the present disclosure.

FIG. 4d shows the result of a comparison of the detected links with known links, in accordance with aspects of the present disclosure.

FIG. 5a shows the clusters of the electronic devices and the links of certain electronic devices, in accordance with aspects of the present disclosure.

DETAILED DESCRIPTION

Figure 1:
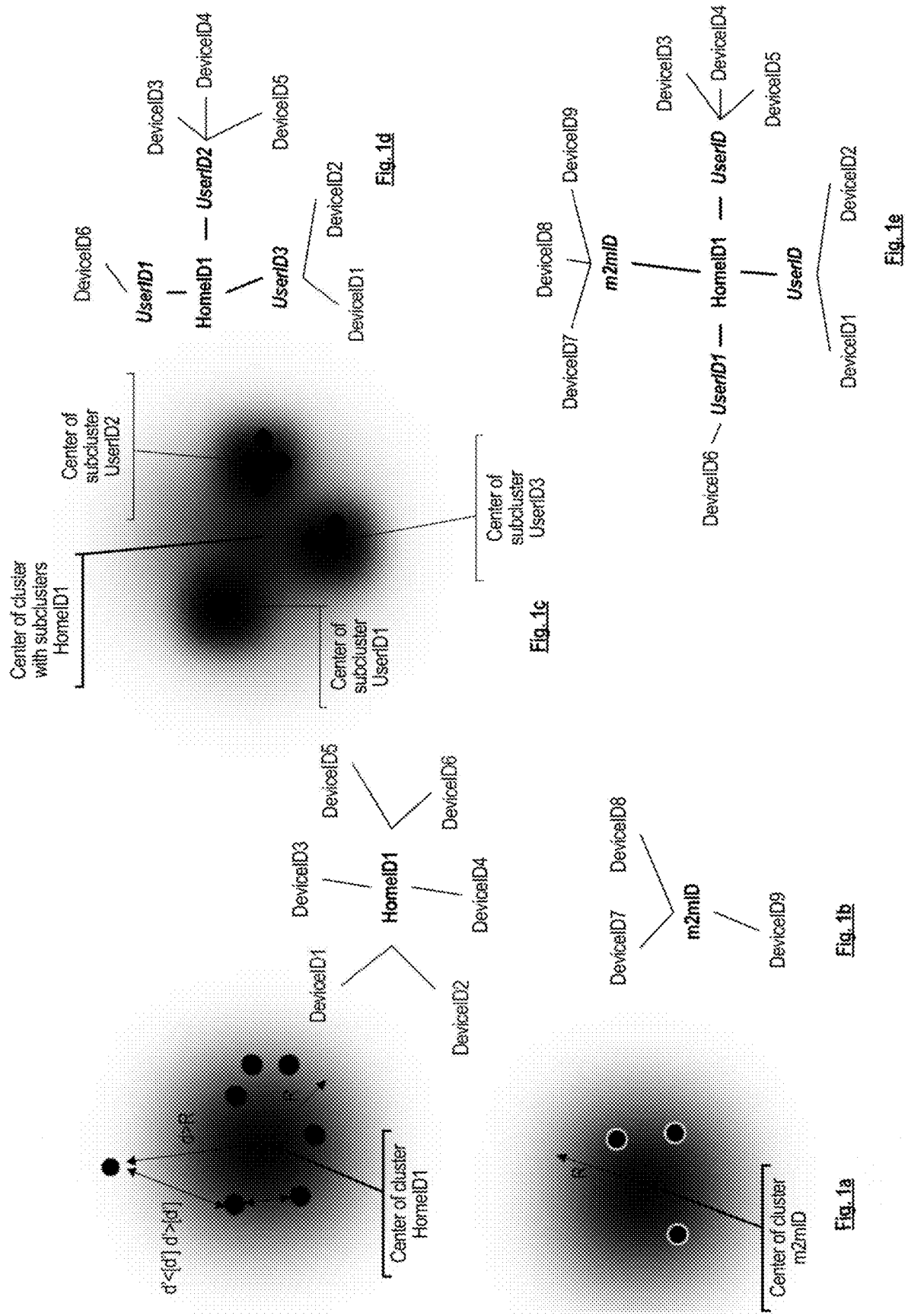
FIG. 1a shows examples of clusters of electronic devices, in accordance with aspects of the present disclosure.
FIG. 1b shows examples of environment profiles, in accordance with aspects of the present disclosure.
FIG. 1c shows an example of an expanded device cluster with subclusters, in accordance with aspects of the present disclosure.
FIG. 1d shows an example of an expanded environment profile, where in addition to the devices of the environment there are also identified the users of these devices, in accordance with aspects of the present disclosure.
FIG. 1e shows an example of an expanded environment profile, where in addition to the users there is also identified a M2M network within the home network, in accordance with aspects of the present disclosure.

Exemplary aspects are described herein in the context of a system, method, and computer program product for clustering electronic devices. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

A number of definitions and concepts that will be used in describing variant aspects of the present disclosure will now be introduced.

A link profile (relation) is an abstract entity which in a particular instance contains the characteristics of a connection and interaction (the link characteristics) between an electronic device and an access point, between an electronic device and an electronic device, between an electronic device and an IoT (Internet of Things) device. Thus, the link profile comprises information characterizing the communication link which has been transformed and packaged into a data structure suitable for processing, comparing, and building of aggregates and surrogates (vectors). As used herein, the term "electronic devices" refers to mobile telephones, notebooks, tablets, personal computers and the like. One of the link characteristics may be the type of network within which connections are established with devices and a link is formed (for example, a wireless household network, a public wireless network, M2M (Machine to Machine), Global System for Mobile communication (GSM) and so forth). The profile can be expressed as an N-dimensional vector of characteristics, whose components are the communication link characteristics. In one aspect, the characteristics of the network connection are a subset of the communication link characteristics (and therefore the attribute communication link is used, rather than a connection). The attribute communication link describes a larger number of characteristics than a connection. The link characteristics may be at least:

the rule for forming the network connection between the electronic device and the environment surrounding the electronic device;

the duration of the established connection between the electronic device and the environment surrounding the electronic device;

the type of connection between the electronic device and the environment surrounding the electronic device;

the stability of the connection between the electronic device and the environment surrounding the electronic device;

the geolocation of the connection between the electronic device and the environment surrounding the electronic device;

the characteristics of the network traffic between the electronic device and the environment surrounding the electronic device;

the characteristics of the electronic device with which the communication link is established.

The term "environment surrounding an electronic device" refers to the computer networks or other electronic devices with which a connection is or may be established by any of the known protocols.

The term "N-dimensional vector of communication link characteristics" refers to an ordered set of N numbers, where the numbers are the coordinates of a vector. Qualitative (so-called categorical) characteristics may be encoded in numbers. The number of coordinates of a vector is known as the dimensionality of the vector. The coordinates determine the position of the corresponding communication link of the electronic device or certain characteristics of the communication link (such as the type of communication link, the MAC address, the SSID). The vector is obtained by transforming information about the surrounding environment and the electronic device. The vector reflects certain information about the surrounding environment.

The term "Clustering of electronic devices" is an ordering of electronic devices into comparatively homogeneous groups (clusters) on the basis of one or more attributes, such as the communication links or individual characteristics of the communication links. By a clustering of an electronic device is meant the finding of a cluster of electronic devices having similar communication links, whereby a new cluster is created in the absence of such clusters. An example of clusters of electronic devices is shown in FIG. 1a.

The term "cluster of devices" refers to an ordered group of devices unified on the basis of a similarity of particular characteristics, such as a similarity of communication links. In an aspect, a cluster is described by an environment profile (shown in FIG. 1b), while an expanded cluster (a cluster with subclusters shown in FIG. 1c) is described by an expanded environment profile (shown in FIG. 1d and FIG. 1e). An electronic device may be assigned to a certain cluster if the distance from the N-dimensional vector of the device link to the center of the given cluster is less than the radius of the cluster ("R") in the direction of the N-dimensional vector. In an aspect, an electronic device is assigned to a certain cluster if the value of the distance ("d'"" in FIG. 1a) from the N-dimensional vector of an element to the nearest N-dimensional link vector of that cluster is less than the maximum allowable (the threshold value of the distance [d']) or if the value of the distance ("d" in FIG. 1a) from the N-dimensional link vector to the center of that cluster is less than the radius of this cluster. Variants of distances for evaluating proximity may include, for example:

linear distance;
Euclidean distance;
square of the Euclidean distance;
generalized Minkowski power distance;
Chebyshev distance;
Manhattan distance.

The term "proximity measure" for evaluating proximity (the degree of similarity, the coefficient of similarity) is a nondimensional parameter for determining the similarity of elements of a collection of electronic devices. To determine the proximity measure, one uses the metrics:

Ochiai;
Jaccard;
Sokal-Sneath;
Kulczynski;
symmetrical Dice.

The term "center of a cluster" (centroid) refers to a vector whose elements represent mean values of corresponding attributes, calculated from all the vectors of the cluster. For clusters consisting of a single vector, that vector will be the center of the cluster.

The term "radius of a cluster" (radius "R" shown in FIG. 1a) refers to the maximum distance of the N-dimensional vectors making up the cluster from the center of the cluster.

Various known algorithms and methods may be used for clustering, including hierarchical (agglomerative and divisive) and nonhierarchical ones.

The term "environment profile" refers to a structured aggregate of data about a group of electronic devices unified on the basis of communication links of the same type. FIG. 1b, for example, shows profiles for a local private (home) network and for M2M. In an aspect, an environment profile is a machine-readable description of a cluster of electronic devices.

The term "expanded environment profile" refers to an environment profile supplemented with data about the users of the electronic devices (shown FIG. 1d) or about adjacent networks, such as M2M (shown in FIG. 1e).

The term "communication link type" refers to one of the characteristics of a communication link which characterizes the type of network with which or within which connections are established. It is possible to identify at least the following types of networks:

a local private (home) network;
a local public network;
GSM network;
M2M (a network with node to node transmission, in an aspect, a connection to the IoT);
a Mesh network The term "typing of links" refers to the process of determining the type of a communication link. To determine the type of communication links, both heuristic rules and machine learning (including, but not limited to, decision making trees, neural nets, clustering, and the like) may be used. In order to form heuristic rules, communication links may be selected whose type is known and the characteristics are identified (for example, the values of the characteristics are sought) which in a guaranteed manner allow/disallow the assigning of the communication link to a given type and on the basis of these characteristics a heuristic rule is formed and applied to the communication links whose type is unknown. When there is no heuristic rule, or the number of characteristics is not sufficient, the typing of links may be done by comparing (determining the similarity metric of) the vector of the communication link whose type is unknown and the vectors of communication links whose type is known. The following characteristics may be used for the typing of links:

the presence of authorization for connecting to the network;
the type of encryption used;
the local time of connection to the network and disconnection from it;
the frequency of connections to the given network;
the name of the network (slid);
the day of the week when the connection occurred;

the number of devices connected to the access point;
the presence alongside other access points expanding the network of the given point (roaming point).

Similarity may be determined by various methods. For example, if a communication link is described by a vector composed of the characteristics of the communication link, then communication links are considered to be similar if at least one of the characteristics of the unknown communication link is identical to an analogous characteristic of another communication link. In an aspect, such characteristics may be the MAC address, the name of the access point, the type of communication link. Communication links are also considered to be similar if the distance between the vector of one established communication link and the vector of another communication link in N-dimensional space or in a projection onto one of the selected measurements (for example, a measurement plotting the duration or frequency of connections based on which the link is formed) is less than a threshold value or, in the general case, if the scalar product of the vectors does not exceed a predetermined threshold value.

A trained neural network may also be used for the typing of links, where the characteristics of the communication link are presented at the input to a neural network, and the type of link is obtained at the output of the neural network. A neural network may be trained by conventional methods known in the art on the basis of communication links whose type is known.

The term "intercluster link profile" refers to an abstract entity which in an aspect contains the characteristics of similar communication links, the characteristics of electronic devices from different clusters whose communication links are similar to each other, and the profiles of the users of these electronic devices. The method of detection of similar links is described below in conjunction with FIG. 5. Thus, the intercluster link profile is information about similar communication links, the electronic devices in which they are detected, and the users of these electronic devices, which has been transformed and packaged into a data structure suitable for processing, comparing, and constructing aggregates and surrogates (such as vectors). The characteristics of an intercluster link may include:
the clusters and subclusters between which a link is formed;
the strength of the intercluster link (determined by the degree of similarity of the links, described more closely in FIG. 5, by the number of similar communication links, by their type, and by the number of electronic devices with similar communication links);
the types of similar communication links;
the duration of existence of the similar communication links;
the profiles of electronic devices with similar communication links;
the profiles of the users of these electronic devices.
The intercluster link profile in the general case contains information about all similar links detected between electronic devices from two clusters which are linked together.

The term "typing of an intercluster link" refers to a typing of a link performed, based on an intercluster link profile, in order to determine the relation between the users of electronic devices from the linked clusters and the clusters themselves (and in an aspect, the home network, if the clusters bring together electronic devices from the same home network). The typing of an intercluster link may be done, for example, on the basis of a comparison of the intercluster link profile with another profile whose type is known or with the use of a neural network, where the characteristics of the intercluster link are presented to the neural network at the input, and the type of communication link is obtained at the output of the neural network, where the neural network has been previously trained on marked clusters and intercluster links.

The term "cyberattack" refers to a potential occurrence which is able to disrupt the proper functioning of a system and thereby directly or indirectly cause some harm. The types of cyberattacks may be very diverse and they may have many classifications. In an aspect, a classification may be used based on the nature of the disruption, namely:
breach of confidentiality of data;
breach of integrity of data/substitution of data;
disruption of the working capacity of the system (including denial of service);
unauthorized intervention in the functioning of the system.

The term "cyberattack model" refers to a formalized description of cyberattacks to information security of a system. Cyberattack model may include at least:
the type of cyberattack, where a cyberattack is unauthorized use of the system reflecting the interest of the violator;
the element by which the given type of cyberattack is realized;
the method of realization of the cyberattack by that element;
the vector of action on the system to carry out the method of realization of the cyberattack (the attack vector).

The term "method of realizing a cyberattack, or the attack" refers to the actions of the violator to realize the cyberattack to the security of a particular type. For each element of the system, a particular type of cyberattack may be realized by different methods, including the exploiting of other components of the system.

The term "attack vector" refers to the direction or specific method of acting on the system by the violator when realizing the cyberattack to security. The attribute "attack vector" in the present disclosure is identical to the attribute "vector of acting on the system to carry out the method of realizing a cyberattack". The characteristics determining the attack vector may include at least:
the source or group of sources of the attack;
the element or group of elements which are the target of the attack;
the kind of action;
the means of action.

The cyberattack model and the usage model might not formally differ from each other in any way (except for the attack vector) for one and the same system or complex. A classifying attribute making it possible to distinguish one model from another is the fact that the usage model reflects the interest of the legitimate user, while the cyberattack model reflects the interest of the violator. Examples of models for actual systems shall be presented below.

Figure 2:
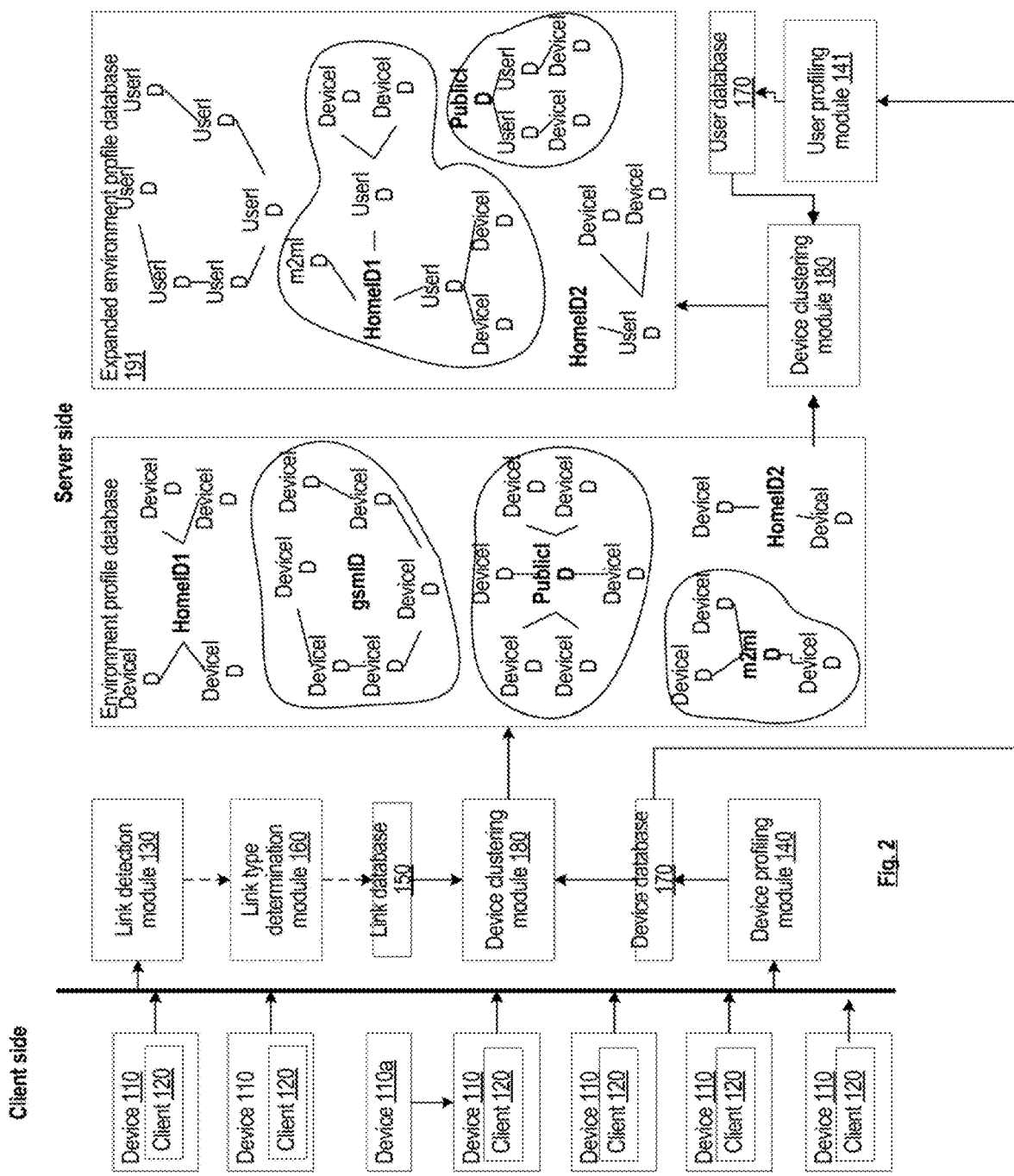
FIG. 2 shows the system for clustering of devices, in accordance with aspects of the present disclosure.

FIG. 2 shows the system for clustering of devices 100, in which a plurality of electronic devices 110 are present. The electronic devices may include but are not limited to:
personal devices;
the IoT of a device;
routers and other network equipment.

In an aspect, the electronic devices 110 may have clients 120 installed thereon. The clients 120 may gather information about the electronic device and about the environment surrounding the device. The environment surrounding the electronic device may include:
- other electronic devices 110 having clients 120;
- electronic devices 110a with which a connection can be established, but which do not have clients 120 (for example, personal devices such as a personal computer, a mobile telephone, a tablet, and so forth), the IoT of a device, including household appliances, and also network equipment.

The information gathered by the clients 120 may be sent to the server side and used by the link detection module 130 and by the device profiling module 140. The link detection module 130 may be configured to detect communication links on the basis of the information gathered by the client 120 about the environment surrounding the electronic device 110 and to form the link profile. The device profiling module 140 may form the profile of electronic device 110 based on the information gathered by the client 120. In an aspect, the profile of an electronic device 110 may be an abstract entity (such as an entry in a database), which describes the device. In an aspect, the profile of an electronic device may include at least the following information: the operating system, the applications installed, the device specification, and the like. Each device profile may be assigned a device identifier (DeviceID N). In an aspect, the link detection module 130 and the device profiling module 140 may reside on the electronic devices 110. The link profiles may be kept in a link database 150. The link type determination module 160 may be configured to determine types of the detected communication links. The device profile may be kept in a user database 170. The device clustering module 180 may be configured to group the devices based on the similarity of the communication links and based on the similarity of the profiles of the users of these electronic devices. The device clustering module 180 may group the electronic devices based on the similarity of the links using at least one of:
- any characteristic of the communication link, such as the type of communication link;
- any group of characteristics, such as the MAC address of the access point and its name (SSID);
- all of the characteristics of the communication link.

During the clustering, vectors may be formed by the device clustering module 180 from the selected characteristics of the communication link and plotted in N-dimensional space. The device clustering module 180 may consider the vectors that fall within the radius of a cluster to be assigned to that cluster. In an aspect, the radius may be equal to zero. From the results of the clustering, the device clustering module 180 may generate profiles, for example profiles of the environment. The generated profiles may be saved in the environment profile database 190. It should be noted that the clusters themselves may also be saved in the environment profile database. Based on the information gathered from the electronic devices and the profiles of the electronic devices, as well as based on the information obtained from other systems, the user profiling module 141 may generate the profile of the user, saving the generated profile in the user database 170. For the profiling of the users, the user profiling module 141 may use, for example: the network activity of the electronic device; data on the movement of the electronic device in space; various personal network identifiers, detected on the electronic device; email addresses from traffic, logins, telephone numbers, and so forth. This information may be transformed and packaged into a data structure convenient for processing, comparing and constructing aggregates and surrogates (vectors, dictionaries, and so on)—the user profile. The device clustering module 180, using the clusters of devices and the profiles of the users, may perform a supplementary clustering within the clusters of devices from the environment profile database 190. The device clustering module 180 may group the devices within a cluster of devices based on the similarity of the user profiles of the electronic devices. From the results of the clustering, expanded environment profiles may be generated by the device clustering module 180. The expanded environment profiles may be saved in a database of expanded environment profiles 191. The expanded clusters themselves may also be saved in the expanded environment profiles database 191.

Figure 3:
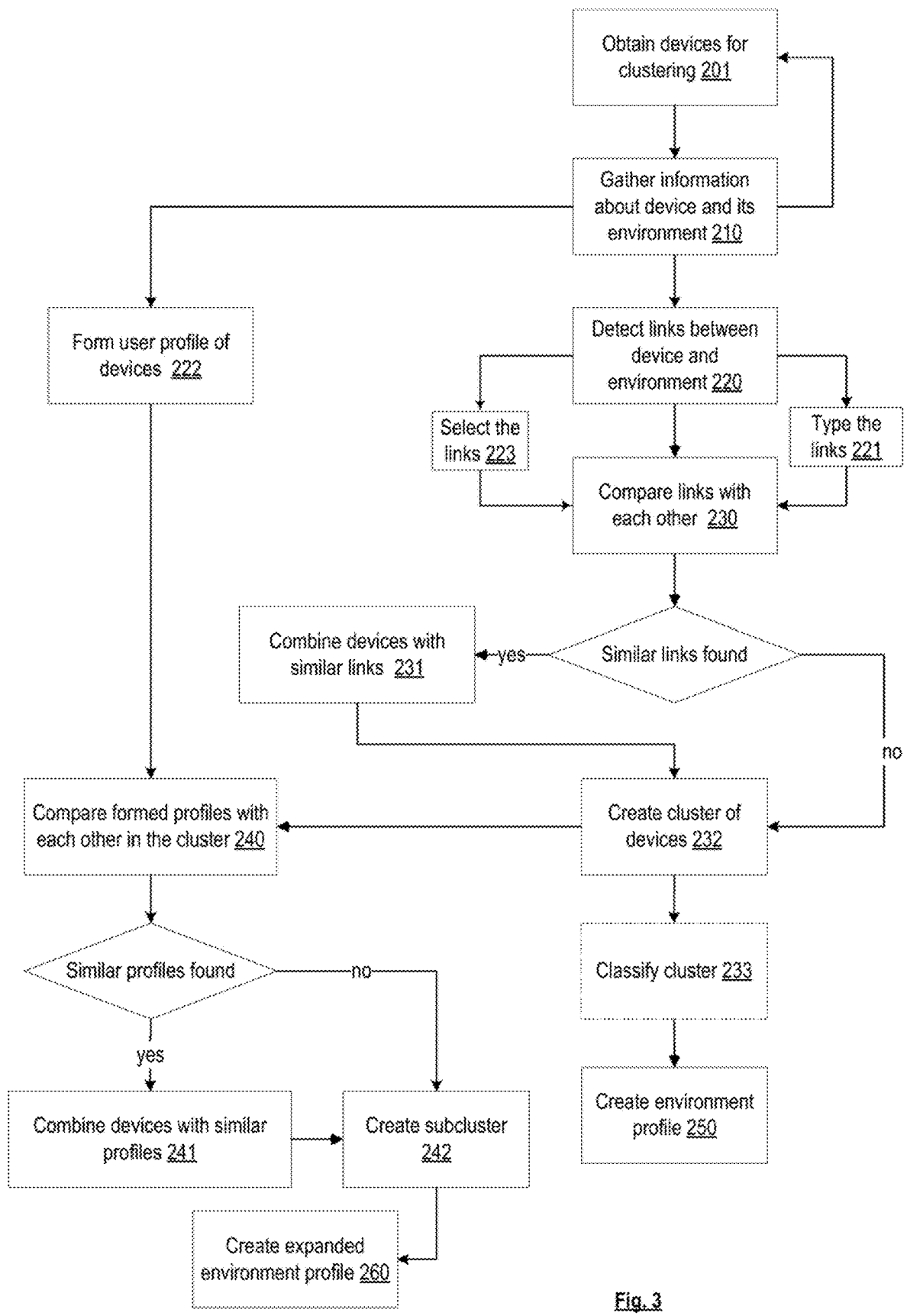
FIG. 3 shows the method of forming clusters of electronic devices, in accordance with aspects of the present disclosure.

FIG. 3 shows the method of generating clusters of electronic devices 200. In step 201, device clustering module 180 obtains the devices 110/110a for the clustering. In step 210, the client 120 may gather information about the electronic devices 110 on which the client is installed, or about any other electronic device 110a. The client gathers information characterizing the electronic device (hereafter, the device characteristics) and information characterizing the environment surrounding the electronic device (hereafter, the environment characteristics of a mobile device). The device characteristics may include, but are not limited to:
- the characteristics of the device hardware;
- the characteristics of the device software;
- the characteristics of the network traffic generated by the device.

While the environment characteristics may include but are not limited to:
- the characteristics of the networks to which the electronic device is connected;
- the services running on the computer networks with which data is exchanged by the electronic device;
- other electronic devices to which the electronic device is connected;
- the services running on the electronic devices to which the electronic device is connected.

In this step, the client 120 may detect other devices (different from those detected in step 201) and may collect information about the connections. For the detection of other devices, the device profiling module 140 may use the following network protocols: Dynamic Host Configuration Protocol (DHCP), Internet Control Message Protocol (ICMP), Address Resolution Protocol (ARP), Multicast Domain Name System (MDNS), Universal Plug and Play (UPNP), NetBIOS (Basic Input Output System) and so forth. The client 120 may also record all connections in a GSM network and detect the IoT of the electronic device, for example, by using the capabilities of the technologies ZigBee, Low Power Wide Area Network (LPWAN), Bluetooth Low Energy (BLE) and so forth. In this step the device profiling module 140 may detect unknown devices of type 110a. Accordingly, the process of detection of devices shown in FIG. 3 may be cyclical (201↔210). On the basis of the gathered characteristics, in step 220, the link detection module 130 may detect the link between the device 110/110a and the surrounding device environment and the link profile may be generated by the link detection module 130.

In an aspect, in step 230, the device clustering module 180 may compare the detected links of the electronic devices. The comparison may be done by surrogates formed from the link profiles. In various aspects, the profiles may be compared directly, or by any method known in the art and suitable for the type of data representing the link profile. If similar links are detected, then in step 231, the device clustering module 180 may merge the electronic devices having similar links. In step 232, in response to not finding any similar links, the device clustering module 180 may create a cluster of electronic devices. It should be noted, the electronic device may be present concurrently in more than one cluster, because:

the communication links may be compared not only by vectors containing all the characteristics of the communication link, but also by individual components of the vectors (the distance between vectors is measured not in space, but in projection);

more than one communication link is detected on the device.

After the cluster has been created in step 232, the device clustering module 180 may create the profile of the environment and link it to the cluster (in step 250).

In an aspect, (for example, in order to identify devices belonging to the same home network), prior to performing the clustering, it may be necessary to determine the type of link detected (step 221) and select the necessary links for the clustering in step 223 (in order to identify the devices of a home network, a link with the home network type is selected). In step 230, the device clustering module 180 may compare the detected communication links of the selected type. In the general case, in step 223, the device clustering module 180 may select the communication links based on any given link characteristic, not just the type.

In step 210, the client 120 may collect not only the environment characteristics but also the electronic device characteristics. In step 222, based on the environment characteristics, the device characteristics, and also supplementary information obtained from external sources with respect to the system, the user profile module 141 may generate the profile of the user of the electronic device. The user profiles generated for the electronic devices of the cluster created in step 232 may be compared with each other by the device clustering module 180 (step 240). This step may be performed in order to find the electronic devices used by the same user. If similar profiles are found, the device clustering module 180 combines these electronic devices within the cluster of devices (in step 241). Next, the device clustering module 180 combines the electronic devices within the created subcluster (step 242). For the electronic devices whose user profiles do not have similar ones in the cluster, in step 242 a subcluster may be created (a singular subcluster). The same device may belong to different subclusters simultaneously, since the electronic device may be used by more than one user. After creating the subclusters, in step 260, the device clustering module 180 may generate an expanded environment profile. The user profiles may be compared by methods analogous to the methods used in comparing the communication links or by any other method known in the art.

The clusters of the electronic devices, after being created, may be classified in step 233 on the basis of, for example, in what way the communication links that were used to combine the electronic devices into the cluster are similar:

if classification is done on the basis of belonging to the same home network type, the MAC address, and the network SSID, then the cluster may be classified as home network N (in the examples of the present disclosure, such clusters are designated as HomeID N);

if classification is done on the basis of belonging to the public network type, the MAC address, and the network SSID, then the cluster may be classified as public network N (in the examples of the present disclosure, such clusters are designated as PublicID N).

FIG. 3*a*-3*e* show an example of the implementation of the method of formation of clusters. The clusters in the example are shown differently than in FIG. 1, since there is no need to depict them in N-dimensional space. They have been developed into a tree for ease of illustration, where the root node corresponds to the cluster identifier, the internal node (for expanded clusters) corresponds to the user identifier, and the leaves correspond to the electronic devices. Hence, there are electronic devices 110 (shown in FIG. 3*a*) with an installed client 120 (not shown in the figure). In some aspects, it may be necessary to form clusters from these electronic devices, in order to identify electronic devices belonging to the same home network, and to divide up these electronic devices by owner/user within the same home network.

Figure 3B:
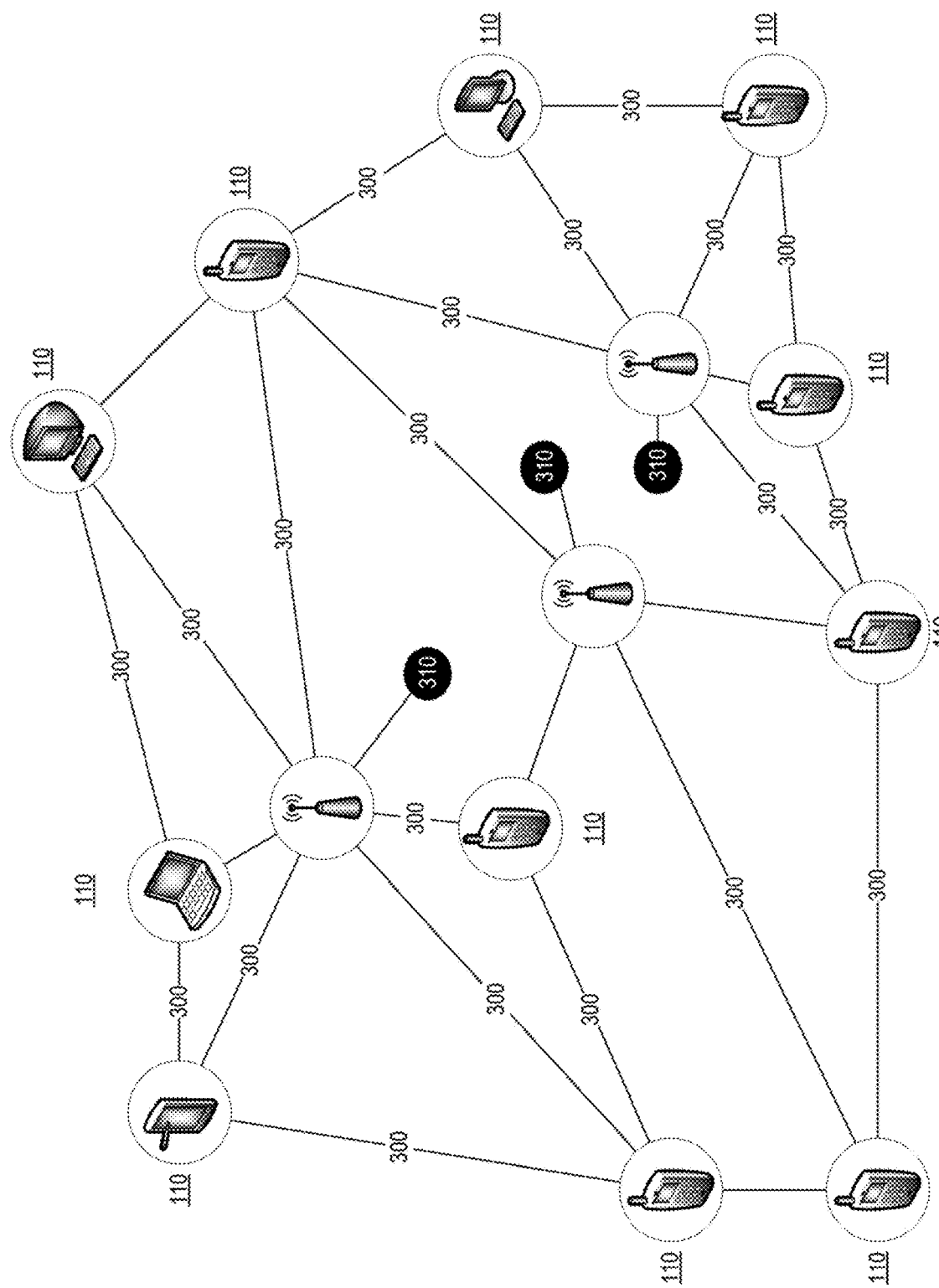
FIG. 3b shows a set of electronic devices with detected links, in accordance with aspects of the present disclosure.
Figure 3C:
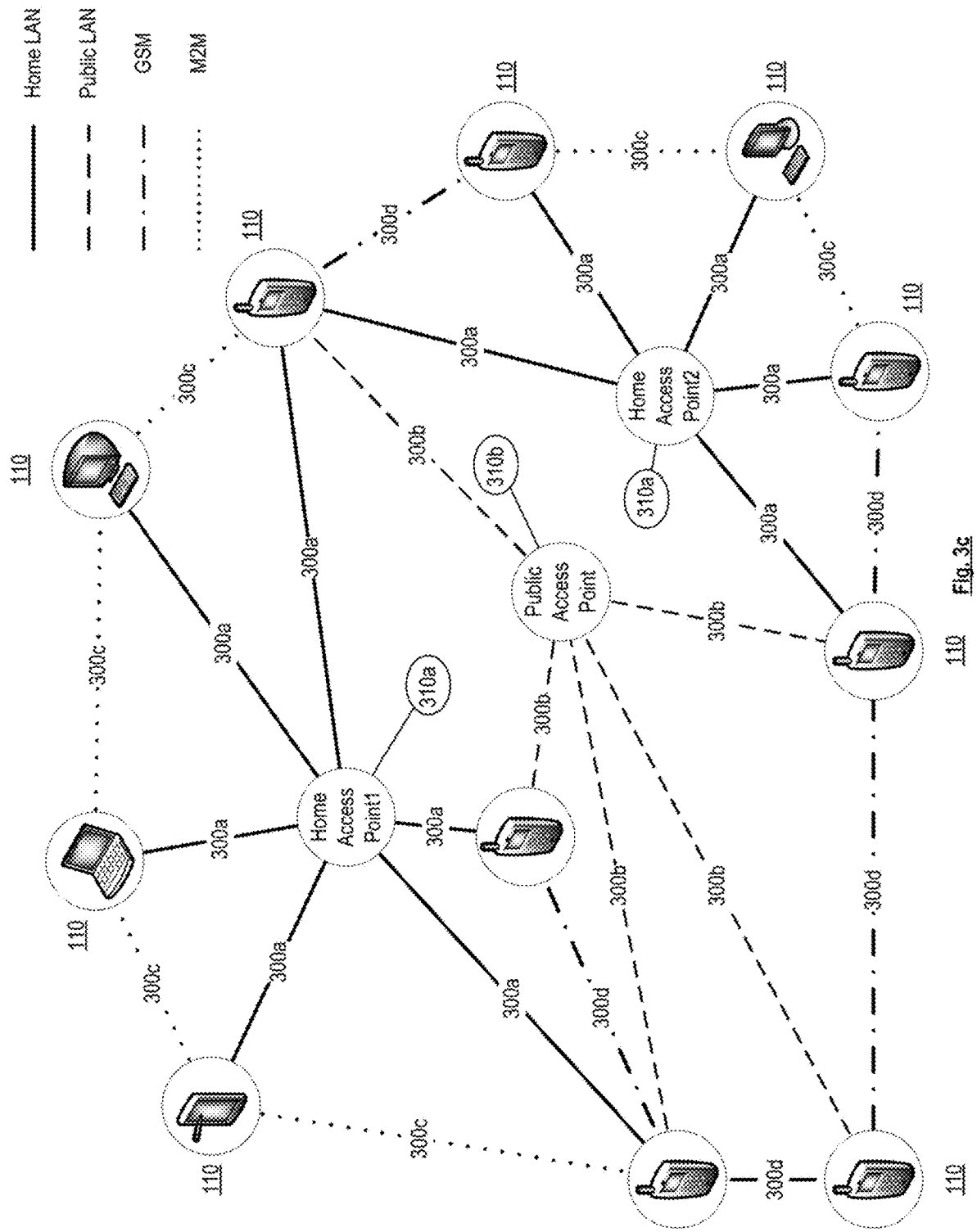
FIG. 3c shows a set of electronic devices with detected links after a determination of type of each of these links, in accordance with aspects of the present disclosure.

The client 120 on the electronic devices may collect information characterizing the electronic device and information characterizing the environment surrounding the electronic device; this information may be collected and compiled over the course of a certain time, such as a week. Then, as shown in FIG. 3*b*, based on the gathered characteristics, the link detection module 130 detects the communication links 300 between the electronic devices and the environment surrounding the devices. In an aspect, the access points 310 are also elements of this environment. The link detection module 130 may also identify types of the detected communication links (shown in FIG. 3*c*). In the given example, communication links may be identified within the following types of networks:

local private (home) network—300*a*;
local public network—300*b*;
M2M—300*c*;
GSM network—300*d*.

The link detection module 130 may also identify types of access points (for example, identifying home access points 310*a* and public access points 310*b*). In an aspect, the link detection module 130 may use the identified type of the access points in order to identify the type of the communication link.

Figure 3D:
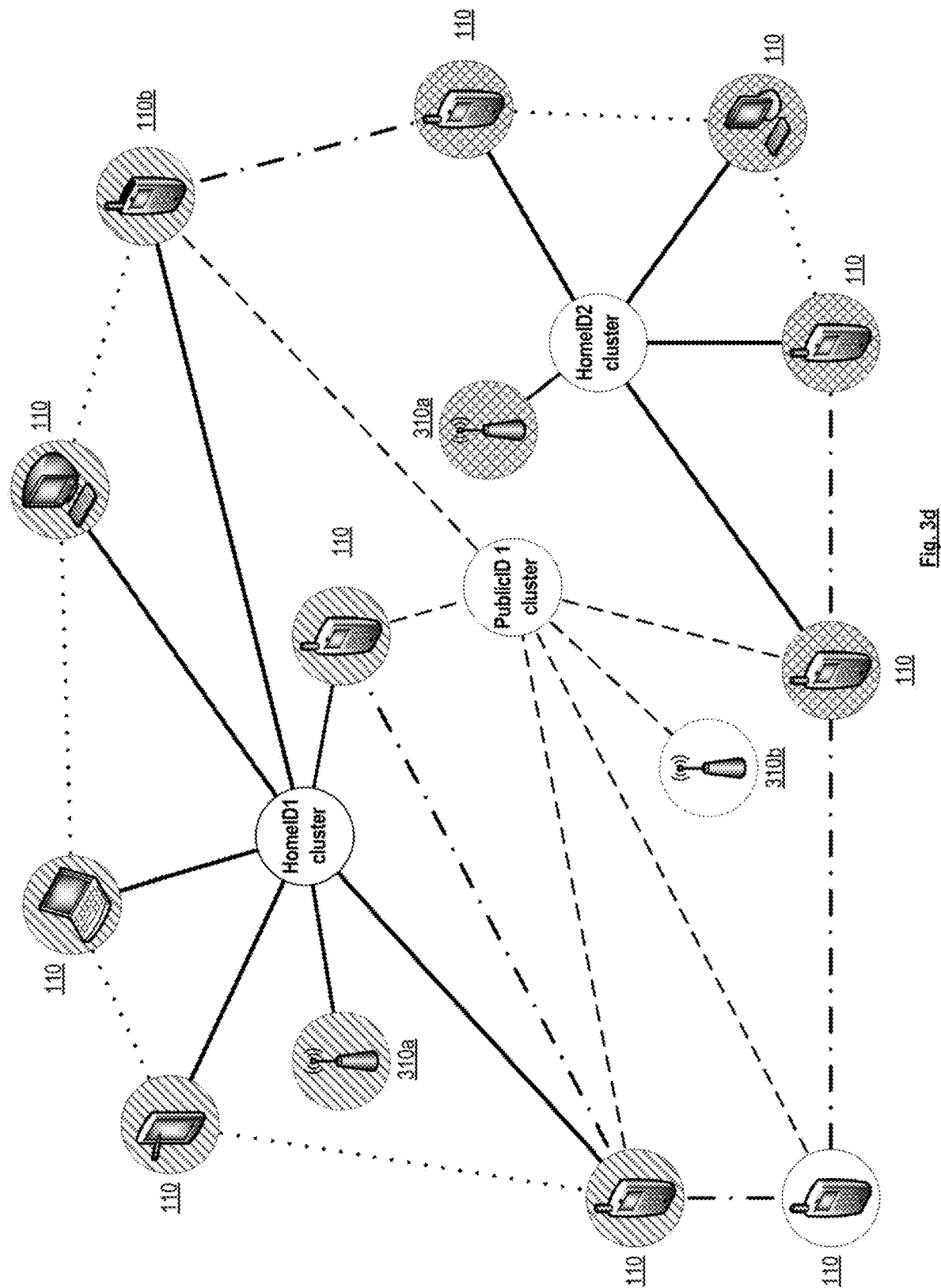
FIG. 3d shows a set of electronic devices with detected links after a determination of type of each of these links and an identification of links associated with local home networks, in accordance with aspects of the present disclosure.

Since according to the conditions, it may be necessary for the device clustering module 180 to identify electronic devices within a single home network, from all the electronic devices the device clustering module 180 may select (shown as step 223 of in FIG. 3) only the electronic devices that have communication links of local private (home) network type (link characteristic link type=local private (home) network). FIG. 3*d* illustrates examples of these electronic devices with communication links 300*a*. In order to identify electronic devices from the same home network, the electronic devices selected by communication link type, the device clustering module 180 groups the electronic devices and generates a cluster of electronic devices, where the cluster is formed from the electronic devices having similar communication links of the same type. In the given example, communication links are considered similar if at least one of the characteristics of the same communication link (besides the link type characteristics) is identical or similar to an analogous characteristic of another communication link or a communication link selected to be the standard. In the example, such communication link characteristics might be:

the MAC address of the access point (the characteristics should be identical);

the name of the access point—the SSID (the characteristics should be identical);

the duration of the connection (the characteristics should be similar or exceed a certain threshold value of the characteristic of the standard communication link).

Based precisely on the characteristic "duration of connection", the device 110b, having communication links in two networks, is assigned to the cluster HomeID1. The device 110b might belong to a guest, that is, if it appears irregularly in the home network and the duration of the connection is significantly lower than that of the other electronic devices in the home network.

Figure 3E:
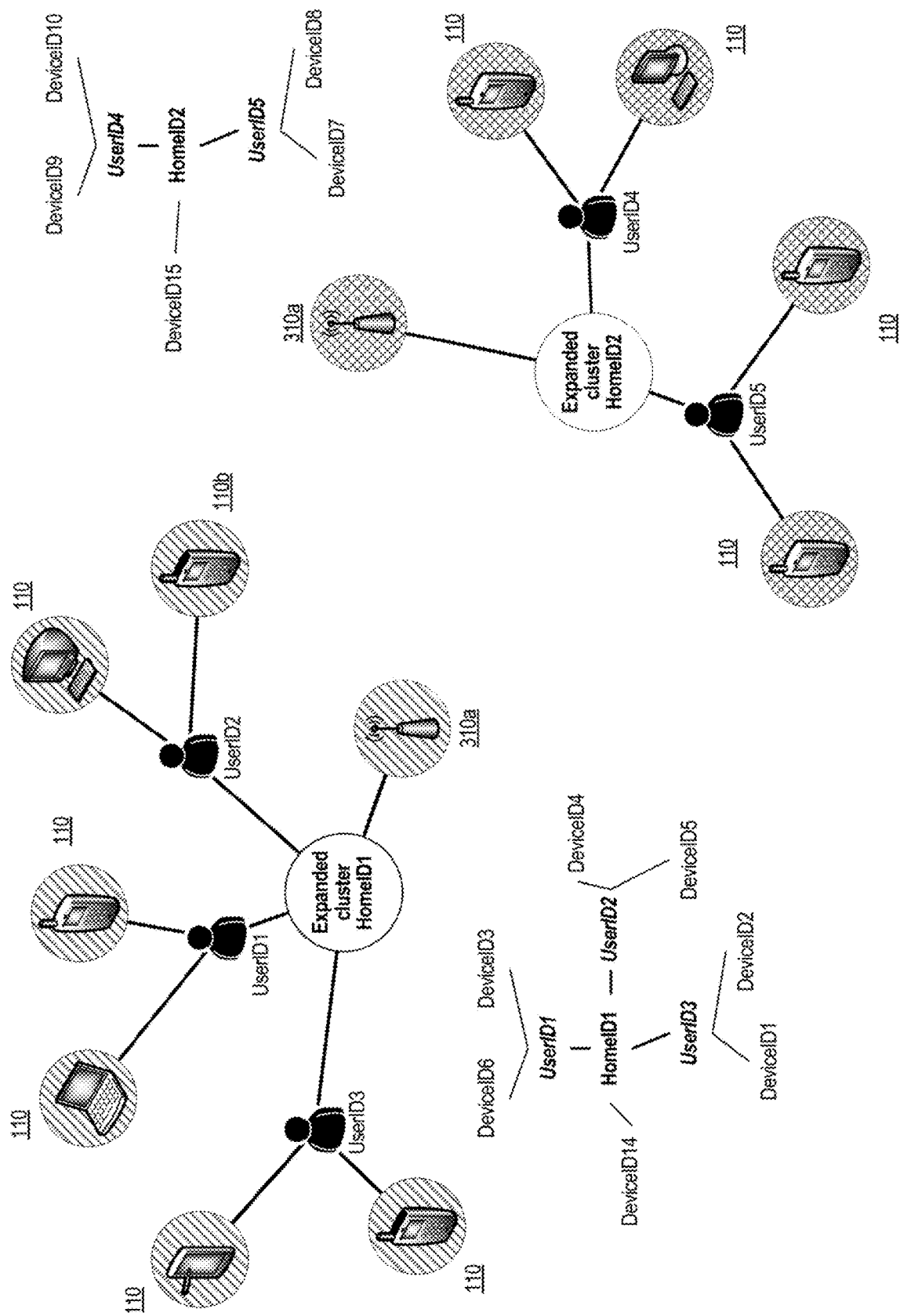
FIG. 3e shows schematically (in the form of a tree) the expanded clusters, where the electronic devices within a cluster of devices are additionally clustered by user, in accordance with aspects of the present disclosure.

Next (as shown in FIG. 3e), the device clustering module 180 may group the electronic devices belonging to the same cluster by owner, using the information gathered about the electronic device and the profiles of the users. Thus, an expanded cluster of electronic devices may be created, and in accordance with this an expanded environment profile may be created, HomeID1 and HomeID2.

Figure 4:
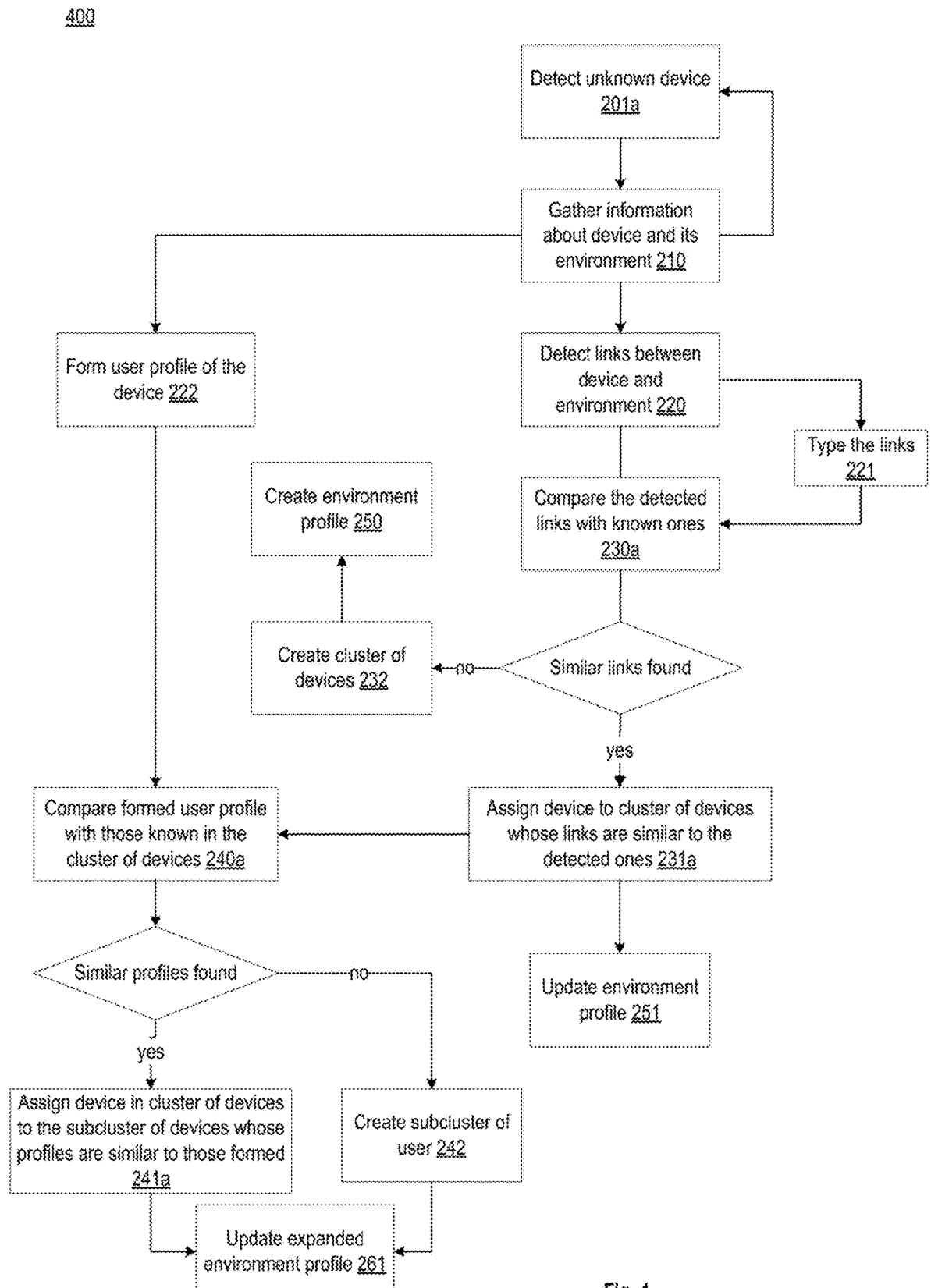
FIG. 4 shows the method of assigning an unknown device to a cluster, in accordance with aspects of the present disclosure.

FIG. 4 shows the method 400 of assigning an unknown device to a cluster. In step 201a, the device profiling module 140 detects the unknown electronic device. The device detection occurs at least when:

- the client 120 installed on the device 110 sends out the identifier of the electronic device 110 on which it is installed and that identifier is missing from the database 170;
- the client 120 registers its first launching on the electronic device 110;
- the electronic device 110 with the installed client 120 registers in its environment the electronic device 110a about which information is missing both in the client database 120 and in the database 170 at the server side.

Thus, an electronic device about which information is missing from the database of the system 100 is considered to be unknown. In step 210, the client 120 may collect information about the electronic device 110 on which the client is installed, or about any other electronic device detected in step 201. The client 120 may collect information characterizing the electronic device (device characteristics) and information characterizing the environment surrounding the device (device environment characteristics). Possible characteristics of the electronic device and the environment have been enumerated above. In step 210, the client 120 may detects other electronic devices (different from those detected in step 201) and may compile information on the connections, using for the detection the network protocols DHCP, ICMP, ARP, MDNS, UPNP, NetBIOS and so forth. The client 120 may also register all connections in the GSM network and detect the IoT of the device, for example by using the capabilities of the technologies ZigBee, LPWAN, BLE and so forth. In this step, unknown devices of type 110a may also be detected. Accordingly, in FIG. 4 the process of detection and gathering is shown to be cyclical (201a↔210). Based on the collected characteristics, the link detection module 130, in step 220, may detect the link between the device 110/110a and the surrounding device environment and may generate the link profile.

It may be necessary for the clustering module 180 to detect a cluster of devices containing at least one device whose link is similar to the link detected in step 220. For this, in step 230a the detected communication links may be compared to known ones. If similar links are detected, then in step 231a, the corresponding electronic device may be placed in the clusters of devices whose electronic devices have similar links. As noted above, the same electronic device may end up in more than one clusters at the same time, because:

- the communication links may be compared not only by vectors, but also by individual characteristics (the distance is measured not in space, but in projection);
- an electronic device usually has more than one link.

After the electronic device has been added to the cluster, the device clustering module 180 may need to update the environment profile associated with the cluster (in step 251). In an aspect (for example, in order to identify electronic devices belonging to the same home network), prior to performing the clustering it may be necessary to determine the type of communication link detected (step 221) by network affiliation (home network, public, and so on) and to search for similar ones among the known communication links of the same type. In another aspect, the problem of assigning a device to a home network may be solved differently: for this, the type of the detected communication link is not determined, but the clusters should be previously marked (classified). For example, clusters of electronic devices that are grouped based on a similarity of links, whose link type is identical may be identified. That is, a cluster brings together electronic devices with similar links whose vectors are similar at least by one of the characteristics (in the example, by at least the type of communication link). The clusters may be marked by any method known in the art used for supervised machine learning.

If no similar links are detected during the comparison in step 230a, the device clustering module 180 may create a new cluster of devices in step 232 and the new environment profile is associated with it in step 250.

As noted above, in step 210, not only the environment characteristics but also the device characteristics are collected; on the basis of the environment characteristics, the device characteristics, and supplementary sources the device clustering module 180 may generate the profile of the user of the electronic device in step 222. The device clustering module 180 may compare the user profile generated in step 240a with the profiles of users of other electronic devices of the cluster. This step may be done in order to find the electronic devices used by the same user. If a similar device user profile is found among the electronic devices of the cluster, the devices for which the profile was generated in step 222 may be assigned to a subcluster containing the device with similar user profile by the device clustering module 180. When the profile is similar to the profiles of users of electronic devices from different subclusters, the device clustering module 180 may assign the electronic device to the subcluster with device user profiles having the maximum similarity (closer to the core of the cluster, higher degree of similarity, and so on). In another aspect, the electronic device may be placed in all subclusters containing devices with similar user profiles, this step may be needed because that electronic device may be used by several users. If no similar profiles were found in step 242, the device clustering module 180 may create a new subcluster; this may indicate that a user who was unknown has appeared in the environment. After updating the subclusters in step 241 or creating a new subcluster in step 242, the device clustering module 180 may update the expanded profile associated with the cluster (in step 261).

FIGS. 4a-4e show an example of implementing the method of assigning an unknown device to a cluster. In the example, there are devices 110c/110d with an installed client 120 (not shown in the figures). For the devices 110 shown in FIG. 4a, the device clustering module 180 may be configured to determine the clusters of home network to which the electronic devices and the users of the electronic devices are assigned.

The client 120 may collect information characterizing the electronic device (hereafter, the device characteristics) and information characterizing the environment surrounding the device (hereafter, the device environment characteristics);

this information may be collected and compiled over the course of a certain time, such as a week. Then, as shown in FIG. 4b, on the basis of the gathered characteristics, the link detection module 130 may detect the links 300 between the electronic devices and the environment surrounding the electronic devices. In an aspect, the access points 310 may be considered to be elements of this environment. The link type determination module 160 may determine types of the communication links (as shown in FIG. 4c) on the basis of the information gathered about them. In the given example, communication links may be identified within the following types of networks:

local private (home) network—300a;
local public network—300b.

Since the link detection module 130 attempts to identify electronic devices within a single home network, from all the communication links the link detection module 130 only selects the communication links having the type local private (home) network (link characteristic link type=local private (home) network). Next, in order to detect clusters of home networks to which the electronic devices are assigned, the device clustering module 180 compares the detected device communication links to known device communication links from the device clusters (HomeID1 and HomeID2), depicted in FIG. 3d. In the given example, communication links are considered similar if at least one of the characteristics of the detected communication link (besides the link type characteristic) is identical or similar to an analogous characteristic of another link. In the example, such link characteristics might be:

the MAC address of the access point (the characteristics should be identical);
the name of the access point—the SSID (the characteristics should be identical);
the duration of the established connection (the characteristics should be similar or exceed a certain threshold value of the characteristic of the standard link).

The results of such comparison are shown in FIG. 4d. For the electronic device 110c, similar links are detected on the electronic devices of the cluster HomeID1, and so that device is assigned to the cluster HomeID1 by the device clustering module 180. For the device 110d no similar communication links are found among the known communication links of the electronic devices of the clusters HomeID1 and HomeID2, and so the device clustering module 180 may create a new cluster HomeID3.

Figure 4E:
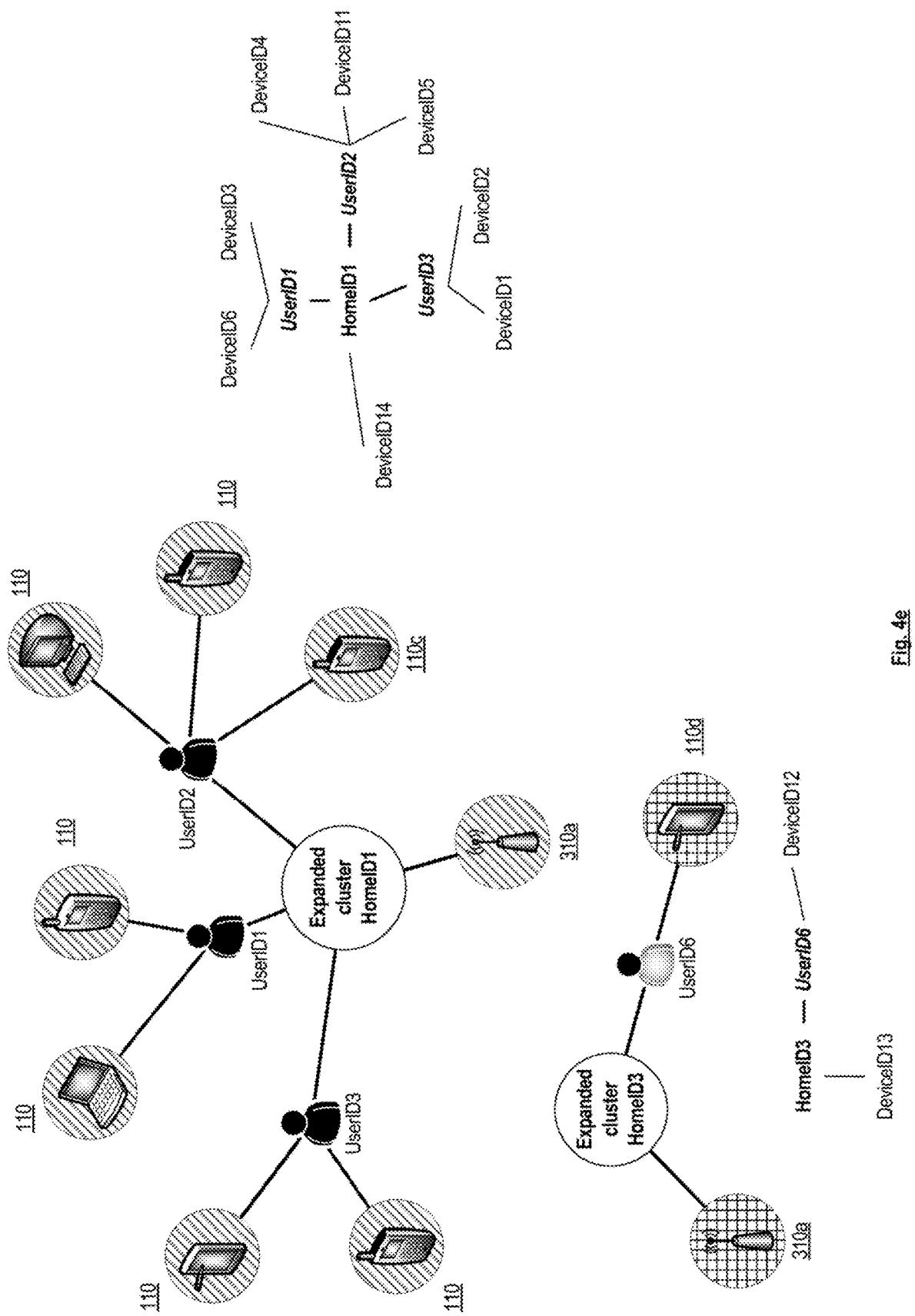
FIG. 4e shows the result of a comparison of the generated user profiles with known profiles of the users of the devices associated with the cluster, in accordance with aspects of the present disclosure.

Referring now to FIG. 4e, using the collected information about the electronic devices and the profiles of the users of these electronic devices, the device clustering module 180 identifies the users of the electronic devices 110c/110d (similar user profiles are searched for among the known ones). For the device 110c, a similar user profile is found (the user profile with the identifier UserID2) and the device clustering module 180 may assign that electronic device to the subcluster UserID2. Continuing with the example illustrated in FIG. 4e, for the electronic device 110d, no similar profile is found. Accordingly the device clustering module 180 may create a new subcluster UserID6 for this electronic device. Thus, the expanded cluster of devices HomeID1 may be updated, in accordance with which the expanded environment profile HomeID1 may be updated, and the expanded cluster HomeID3 may be created, in accordance with which the expanded environment profile HomeID3 may be created by the device clustering module 180.

Figure 5:
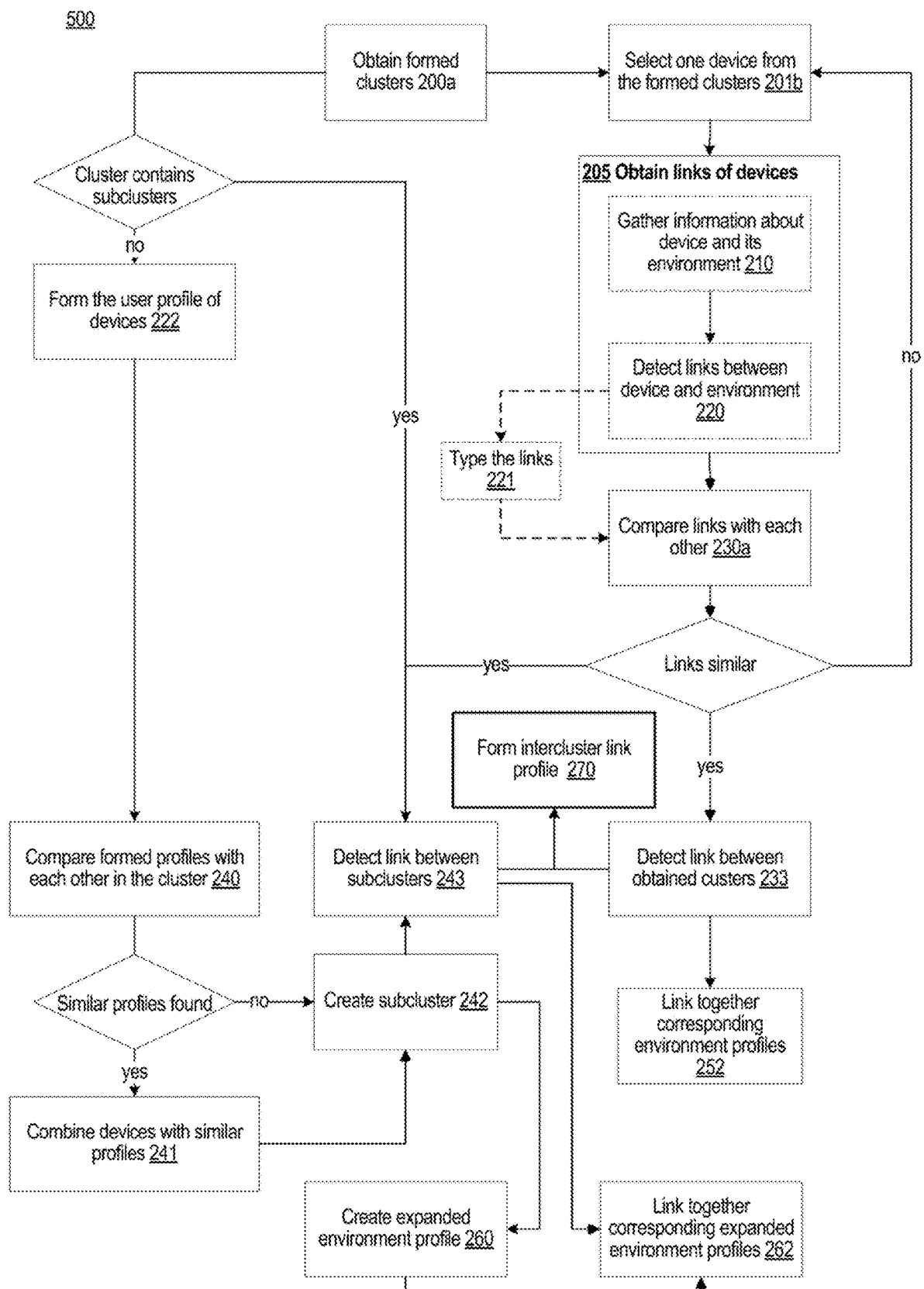
FIG. 5 shows the method of generating links between clusters of electronic devices, in accordance with aspects of the present disclosure.

FIG. 5 shows the method 500 of detecting links between clusters of electronic devices. This method may be implemented by the link detection module 130 and may further include detection of linked home networks and detection of special users—influencers. As used herein, "influencers" are users having electronic devices through which it may be possible to disseminate protection solutions, among other things, and strengthen the comprehensive protection of home networks. The comprehensive protection of home networks is the first step toward creating an immune network system.

In the first step 200a of the method 500, the link detection module 130 may obtain the previously generated clusters of electronic devices from the device clustering module 180. The clusters may have been generated by the method 200 discussed above or by any other method known in the art. In step 200a, at least two clusters are obtained, from which, in step 201b, the link detection module 130 may select at least one device from each of the two clusters. In an aspect, all the electronic devices may be selected. In step 205, the communication links are obtained for the selected devices by the link detection module 130. If the clusters were generated by the method 200 described above, then the communication links for the electronic devices are kept in the link database 150. In other words, the link detection module 130 may obtain the communication links by sending a request to the link database 150. If no device communication links were previously detected or if it is necessary to update the characteristics of the device links, then steps 210 and 220, previously described in conjunction with FIG. 3, may be carried out to obtain the communication links. The obtained links may be compared with each other by the link detection module 130. It should be noted that in this step, the link detection module 130 compares the communication links of electronic devices from different clusters, rather than comparing the communication links of electronic devices from the same cluster with each other. In one aspect, the similarity between the corresponding communication links may be determine by computing a similarity metric. The similarity metric may include at least one of the following: Jaccard; Sokal-Sneath; Kulczynski; symmetrical Dice. If the link detection module 130 determines, based on the computed similarity metric, that compared communication links are similar, then the link detection module 130 may treat the clusters as related clusters. In step 233, the link detection module 130 may detect a link between the clusters. In step 270, the link detection module 130 may generate an intercluster link profile. The environment profiles describing the clusters between which a communication link was detected are also typically related (step 252). The intercluster link profile contains information about the communication link, for example. The intercluster link profile may include but is not limited to the following information: which clusters are related, how strong the communication link is (determined by the degree of similarity obtained in step 230a, the number of similar communication links, their type, and the number of electronic devices with similar communication links), which types of communication links are similar, how long the similar communication links have existed, and so forth. Depending on the nature of the similarity, for example, when the identity of the communication links was detected during the comparison, the link detection module 130 may also treat the subclusters as related ones. Accordingly, in step 243, the link detection module 130 may detect a link between the subclusters. If no subclusters were previously created, the device clustering module 180 creates them by carrying out steps of generating the user profile of devices 222, comparing the generated profiles with each other in the cluster 240, combining devices with similar profiles 241 and creating a subcluster 242. After detecting a link in step 243, the link detection module 130 may treat the corresponding expanded environment profiles as related as well (step 262). The link detection module 130 may reflect all the changes in the intercluster link profile in step 270. If the clusters contain devices from the same home network, then the presence of a link between the clusters indicates that the home networks are related. Generally, if it is possible to link subclusters together, then it may be possible for the link detection module 130 to discover potential influencers or users of one home network who have influence on users of another home network. In an aspect, these users may be taken into account when constructing a protection system and implementing the protection of the home network.

Figure 5B:
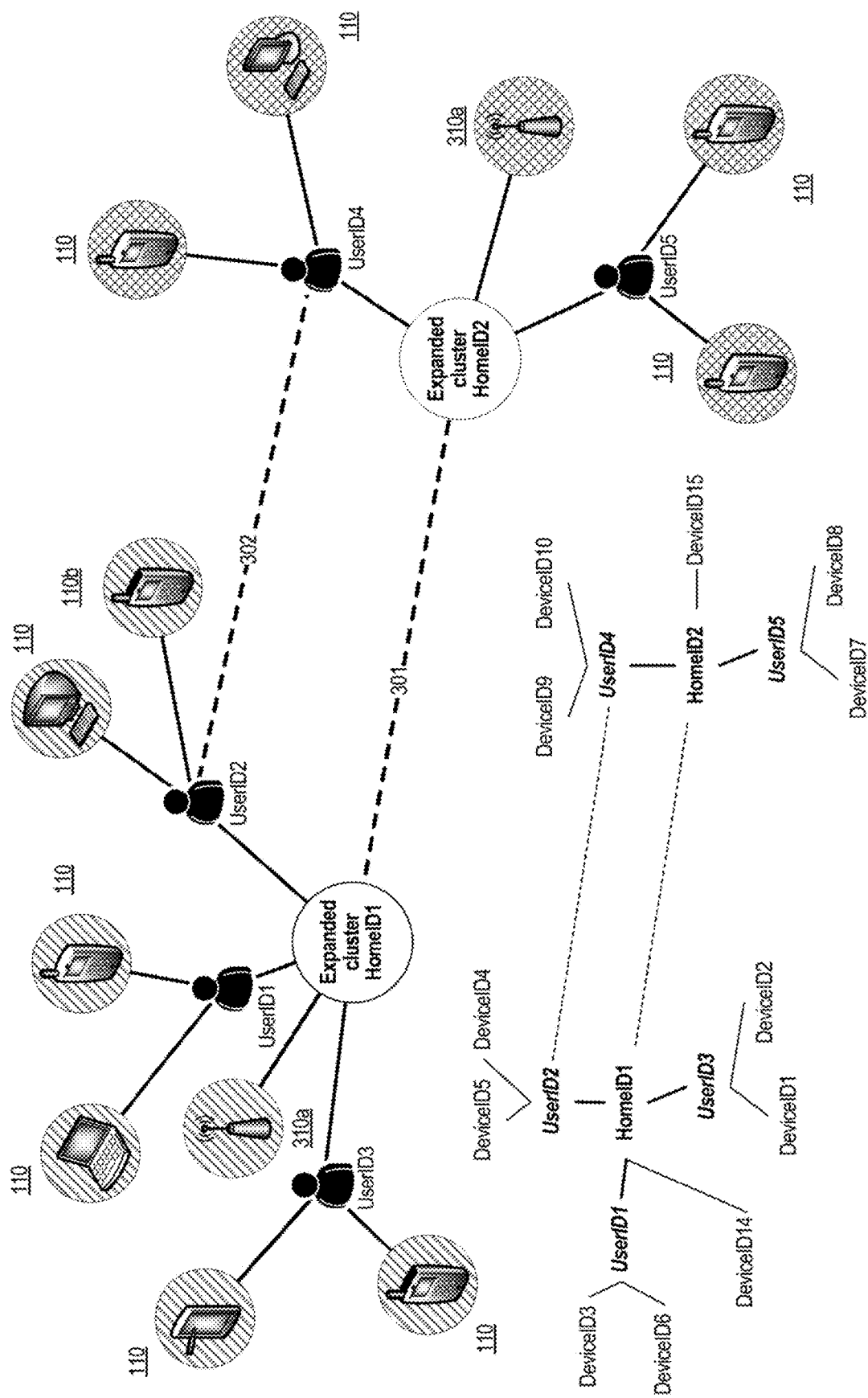
FIG. 5b shows expanded device clusters and expanded environment profiles, as well as the links between them, in accordance with aspects of the present disclosure.

FIG. 5a and FIG. 5b show an example of the implementing of the method of detecting links between clusters. FIG. 5a shows the clusters HomeID1 and HomeID2 previously generated by the method 200 described above in conjunction with FIG. 3. From these clusters, the link detection module 130 may select one electronic device each. The selected electronic devices are shown in FIG. 5a as devices 110b and 110e. The link detection module 130 may obtain communication links for the selected electronic devices. These communication links are:

for the device 110b: 300a' (two links), 300b', 300c', 300d'
for the device 110e: 300a', 300c', 300d'.

The link detection module 130 may compare the obtained communication links with each other. For example, the link detection module 130 may compare link 300a' of electronic device 110b with link 300a' of electronic device 110b. In an aspect, the link detection module 130 may compare only the communication links of the same type with each other. In this process of comparison, the link detection module 130 may select the characteristics by which the communication links are compared. For example, communication links of type 300a may be compared by the characteristics SSID and MAC address of the access point, while a link of type 300d may be compared by all available characteristics. In one aspect, the link type may be determined using heuristic rules and machine learning (including, but not limited to, decision making trees, neural nets, clustering, and the like). In order to generate heuristic rules, communication links may be selected whose type is known and the characteristics are identified, which in a guaranteed manner allow/disallow the assigning of the communication link to a given type and on the basis of these characteristics a heuristic rule may be formed and applied to the communication links whose type is unknown. Since the link detection module 130 may compare the communication links of type 300a by the name and address of the access point, while the devices 110b and 110e are connected to the access point from the cluster HomeID2 (it is a link with an access point), these communication links may be declared to be similar based on these characteristics. The electronic devices also have communication links 300d', since these communication links were detected when the electronic devices were interconnected in the GSM network, so that the communication link 300d' of the electronic device 110b is identical to the communication link 300d' of the electronic device 110e. No similarity is found between other communication links on the basis of the selected characteristics. The link detection module 130 may proceed further with mutual comparison of links and possibly even other similar communication links will be found on other electronic devices of the clusters. The presence of similar communication links makes it possible to speak of the presence of a link 301 (shown in FIG. 5b) between the clusters HomeID1 and HomeID2, while the presence of identical communication links makes it possible to also relate the subclusters. In the illustrated example, the subclusters combine the electronic devices of the same user, and therefore in FIG. 5b the link 302 is created between the users. Accordingly, the expanded environment profiles are also linked. Upon detecting a link between clusters, the link detection module 130 may fill in the intercluster link profile, indicating on the basis of which types of links and the similarity of which characteristics the link between the clusters was discovered. If necessary, and depending on the purposes for which the search for links between the clusters was carried out, the link detection module 130 may also indicate in the intercluster link profile the characteristics of the electronic devices whose links are similar and the characteristics of the users of these devices (their profiles).

The environment profile for the home network makes it possible to employ an adaptive protection and to respond quickly to emerging cyberattacks. The clients 120 which are installed on the devices 110 make it possible to modify the characteristics of the communication links and the characteristics of the electronic device in order to make the realization of the cyberattack impossible and to defend the home network. The environment profiles and not just home network profiles may be used for similar purposes.

Figure 6:
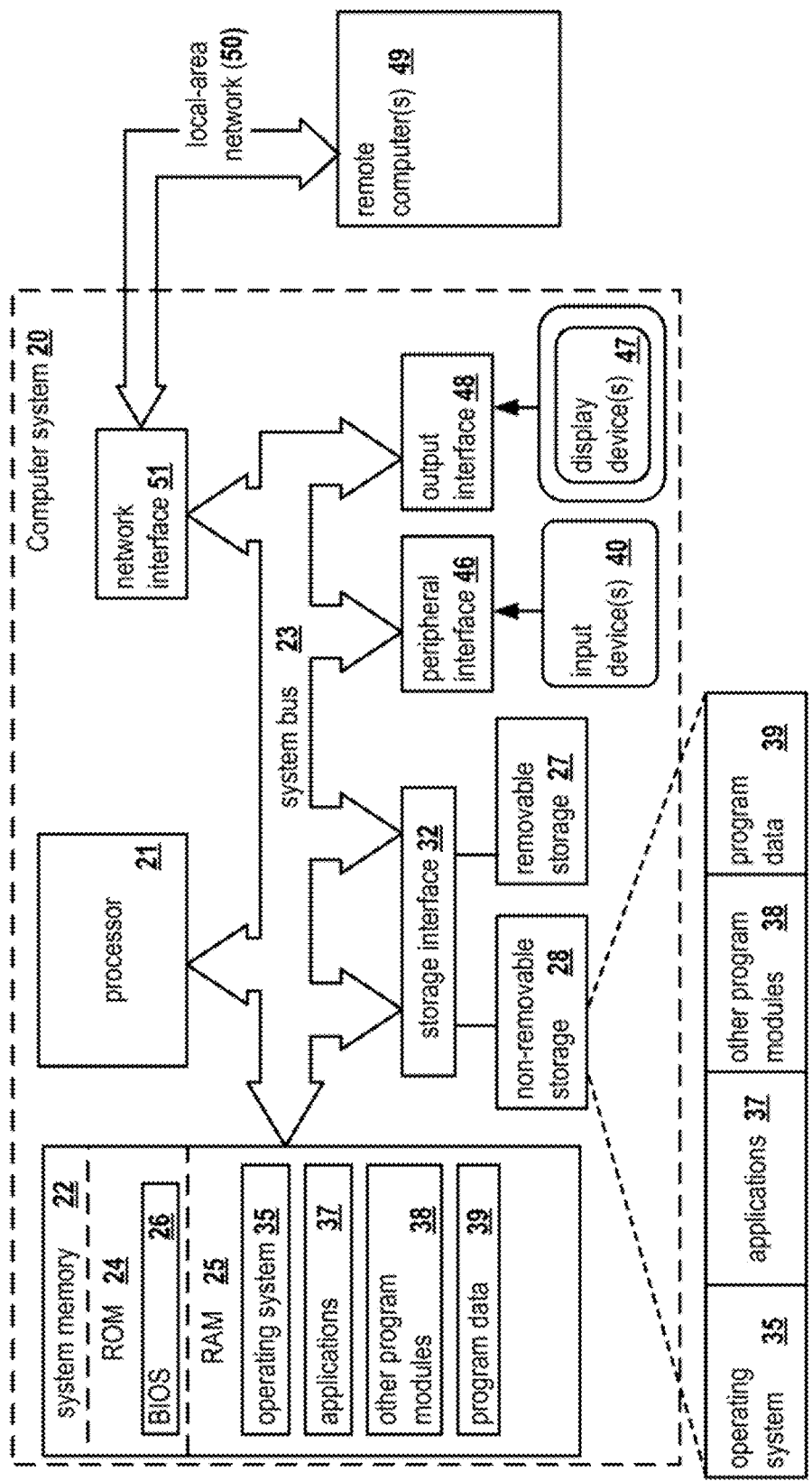
FIG. 6 shows an example of a general-purpose computer system.

FIG. 6 is a block diagram illustrating a computer system 20 on which aspects of systems and methods for detection of malicious files may be implemented in accordance with an exemplary aspect. The computer system 20 may represent the system for clustering of devices 100 from FIG. 2 and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for defending a network of electronic devices from cyberattacks, the method comprising:
    obtaining information about a plurality of devices and information about communication links between the plurality of devices and surrounding environment;
    determining types of the communication links using heuristic rules;
    comparing the types of communication links using corresponding link profiles, wherein the link profile comprises an N-dimensional vector of communication link characteristics and wherein comparing the types of communication links further comprises comparing the N-dimensional vector of the communication link having an unknown type with the N-dimensional vector of the communication link having a known type;
    identifying one or more similar communication links based on the comparison;
    generating a cluster of devices by combining a subset of the plurality of devices, wherein the cluster includes one or more devices having one or more similar communication links;
    generating a surrounding environment profile for the generated cluster of devices; and
    when a cyberattack is detected on one of the devices in the cluster, modifying the surrounding environment profile for the cluster of devices in order to defend all devices in the cluster from the cyberattack.

2. The method of claim 1, wherein the heuristic rules are generated based on one or more characteristics of the communication links having a known type and wherein the heuristic rules are used to identify a type of an unknown communication link.

3. The method of claim 1, wherein the types of the communication links are determined using a machine learning model and wherein the machine learning model comprises one of: a decision-making tree model, a neural net model, a clustering model.

4. The method of claim 1, wherein the communication link characteristics comprise one or more of: one or more rules for forming the network connection between an electronic device and the environment surrounding the electronic device, duration of the network connection established between the electronic device and the environment surrounding the electronic device, type of the network connection between the electronic device and the environment surrounding the electronic device, stability of the network connection between the electronic device and the environment surrounding the electronic device, geolocation of the network connection between the electronic device and the environment surrounding the electronic device, one or more characteristics of the network traffic exchanged between the electronic device and the environment surrounding the electronic device.

5. The method of claim 1, wherein two communication links are identified as similar if the distance between the N-dimensional vector of a first communication link and the N-dimensional vector of a second communication link in N-dimensional space is less than a threshold value.

6. The method of claim 1, wherein generating the cluster of devices comprises comparing the N-dimensional vectors of the communication links associated with the plurality of devices and assigning a device to a respective cluster if the N-dimensional vector associated with the device falls within a radius of the corresponding cluster.

7. The method of claim 1, wherein modifying the surrounding environment profile comprises modifying one or more characteristics of the one or more communication links to defend all devices in the cluster from the cyberattack.

8. A system for defending a network of electronic devices from cyberattacks, the system comprising:
    a hardware processor configured to:
    obtain information about a plurality of devices and information about communication links between the plurality of devices and surrounding environment;
    determine types of the communication links using heuristic rules;
    compare the types of communication links using corresponding link profiles, wherein the link profile comprises an N-dimensional vector of communication link characteristics and wherein the hardware processor configured to compare the types of communication links is further configured to compare the N-dimensional vector of the communication link having an unknown type with the N-dimensional vector of the communication link having a known type;
    identify one or more similar communication links based on the comparison;
    generate a cluster of devices by combining a subset of the plurality of devices, wherein the cluster includes one or more devices having one or more similar communication links;
    generate a surrounding environment profile for the generated cluster of devices; and
    when a cyberattack is detected on one of the devices in the cluster, modify the surrounding environment profile for the cluster of devices in order to defend all devices in the cluster from the cyberattack.

9. The system of claim 8, wherein the heuristic rules are generated based on one or more characteristics of the communication links having a known type and wherein the heuristic rules are used to identify a type of an unknown communication link.

10. The system of claim 8, wherein the types of the communication links are determined using a machine learning model and wherein the machine learning model comprises one of: a decision-making tree model, a neural net model, a clustering model.

11. The system of claim 8, wherein the communication link characteristics comprise one or more of: one or more rules for forming the network connection between an electronic device and the environment surrounding the electronic device, duration of the network connection established between the electronic device and the environment surrounding the electronic device, type of the network connection between the electronic device and the environment surrounding the electronic device, stability of the network connection between the electronic device and the environment surrounding the electronic device, geolocation of the network connection between the electronic device and the environment surrounding the electronic device, one or more characteristics of the network traffic exchanged between the electronic device and the environment surrounding the electronic device.

12. The system of claim 8, wherein two communication links are identified as similar if the distance between the N-dimensional vector of a first communication link and the N-dimensional vector of a second communication link in N-dimensional space is less than a threshold value.

13. The system of claim 8, wherein the hardware processor configured to generate the cluster of devices is further configured to compare the N-dimensional vectors of the communication links associated with the plurality of devices and assign a device to a respective cluster if the N-dimensional vector associated with the device falls within a radius of the corresponding cluster.

14. The system of claim 8, wherein the hardware processor configured to modify the surrounding environment profile is further configured to modify one or more characteristics of the one or more communication links to defend all devices in the cluster from the cyberattack.

15. A non-transitory computer readable medium storing thereon computer executable instructions for defending a network of electronic devices from cyberattacks, including instructions for:
obtaining information about a plurality of devices and information about communication links between the plurality of devices and surrounding environment;
determining types of the communication links using heuristic rules;
comparing the types of communication links using corresponding link profiles, wherein the link profile comprises an N-dimensional vector of communication link characteristics and wherein comparing the types of communication links further comprises comparing the N-dimensional vector of the communication link having an unknown type with the N-dimensional vector of the communication link having a known type;
identifying one or more similar communication links based on the comparison;
generating a cluster of devices by combining a subset of the plurality of devices, wherein the cluster includes one or more devices having one or more similar communication links;
generating a surrounding environment profile for the generated cluster of devices; and
when a cyberattack is detected on one of the devices in the cluster, modifying the surrounding environment profile for the cluster of devices in order to defend all devices in the cluster from the cyberattack.

16. The non-transitory computer readable medium of claim 15, wherein the heuristic rules are generated based on one or more characteristics of the communication links having a known type and wherein the heuristic rules are used to identify a type of an unknown communication link.

* * * * *